United States Patent
Jumonji et al.

(10) Patent No.: US 12,307,787 B2
(45) Date of Patent: May 20, 2025

(54) STATE DETERMINATION DEVICE, STATE DETERMINATION METHOD AND RECORDING MEDIUM

(71) Applicant: NEC Corporation, Tokyo (JP)

(72) Inventors: Nana Jumonji, Tokyo (JP); Gaku Nakano, Tokyo (JP); Chisato Sugawara, Tokyo (JP); Yosuke Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 7 days.

(21) Appl. No.: 18/036,354

(22) PCT Filed: Nov. 20, 2020

(86) PCT No.: PCT/JP2020/043471
§ 371 (c)(1),
(2) Date: May 10, 2023

(87) PCT Pub. No.: WO2022/107330
PCT Pub. Date: May 27, 2022

(65) Prior Publication Data
US 2023/0419687 A1  Dec. 28, 2023

(51) Int. Cl.
*H04N 13/383* (2018.01)
*B60W 40/06* (2012.01)
*G06V 20/56* (2022.01)

(52) U.S. Cl.
CPC .......... *G06V 20/588* (2022.01); *B60W 40/06* (2013.01)

(58) Field of Classification Search
CPC .... G06V 20/588; G06V 10/809; G06V 20/56; B60W 40/06; G08G 1/00
See application file for complete search history.

(56) References Cited

U.S. PATENT DOCUMENTS

| | | | |
|---|---|---|---|
| 8,666,562 B2 * | 3/2014 | Tuononen | B60T 8/172 701/1 |
| 10,373,000 B2 * | 8/2019 | Tong | G06F 18/24 |
| 11,467,596 B2 * | 10/2022 | Kamata | G06T 7/246 |
| 2019/0047527 A1 * | 2/2019 | Falconer | B60W 30/18172 |
| 2020/0257925 A1 * | 8/2020 | Kuwajima | G06F 18/2113 |

(Continued)

FOREIGN PATENT DOCUMENTS

| | | |
|---|---|---|
| JP | H04328669 A | 11/1992 |
| JP | 2007136430 A | 6/2007 |

(Continued)

OTHER PUBLICATIONS

International Search Report for PCT Application No. PCT/JP2020/043471, mailed on Jan. 12, 2021.

(Continued)

*Primary Examiner* — Gims S Philippe

(57) ABSTRACT

A state determination device according to the present invention includes: a memory; and at least one processor coupled to the memory. The processor performs operations. The operations including: combining output from a plurality of determination models for an input image of a road, the plurality of determination models each learned using training data in which at least one of a state of a moving object mounting an imaging device that acquires an image of the road, a state of the road, and an external environment is different.

18 Claims, 17 Drawing Sheets

(56) References Cited

U.S. PATENT DOCUMENTS

| | | | | |
|---|---|---|---|---|
| 2020/0311444 A1* | 10/2020 | Oishi | .................... | G06V 20/56 |
| 2021/0300401 A1* | 9/2021 | Hashimoto | ............ | G06V 20/58 |
| 2022/0253065 A1* | 8/2022 | Toyoura | ................ | G05D 1/024 |
| 2024/0183117 A1* | 6/2024 | Kim | ...................... | G06Q 50/26 |

FOREIGN PATENT DOCUMENTS

| | | | |
|---|---|---|---|
| JP | 2009282783 A | | 12/2009 |
| JP | 2018147261 A | | 9/2018 |
| JP | 2019079166 A | | 5/2019 |
| JP | 2020013537 A | | 1/2020 |
| JP | 2020147961 A | | 9/2020 |

OTHER PUBLICATIONS

English translation of Written opinion for PCT Application No. PCT/JP2020/043471, mailed on Jan. 12, 2021.

* cited by examiner

Fig. 2

| CLOUD AMOUNT | PRECIPITATION AMOUNT | WEIGHT | | |
|---|---|---|---|---|
| | | FINE WEATHER MODEL | CLOUDY WEATHER MODEL | RAINY WEATHER MODEL |
| 0 – 1 | – | 1.0 | 0.0 | 0.0 |
| 2 – 4 | – | 0.8 | 0.2 | 0.0 |
| 5 – 7 | – | 0.7 | 0.3 | 0.0 |
| 8 | – | 0.6 | 0.4 | 0.0 |
| 9 | NONE | 0.1 | 0.9 | 0.0 |
| 10 | | 0.0 | 1.0 | 0.0 |
| 9 – 10 | SMALL | 0.0 | 0.2 | 0.8 |
| | LARGE | 0.0 | 0.0 | 1.0 |

Fig. 16
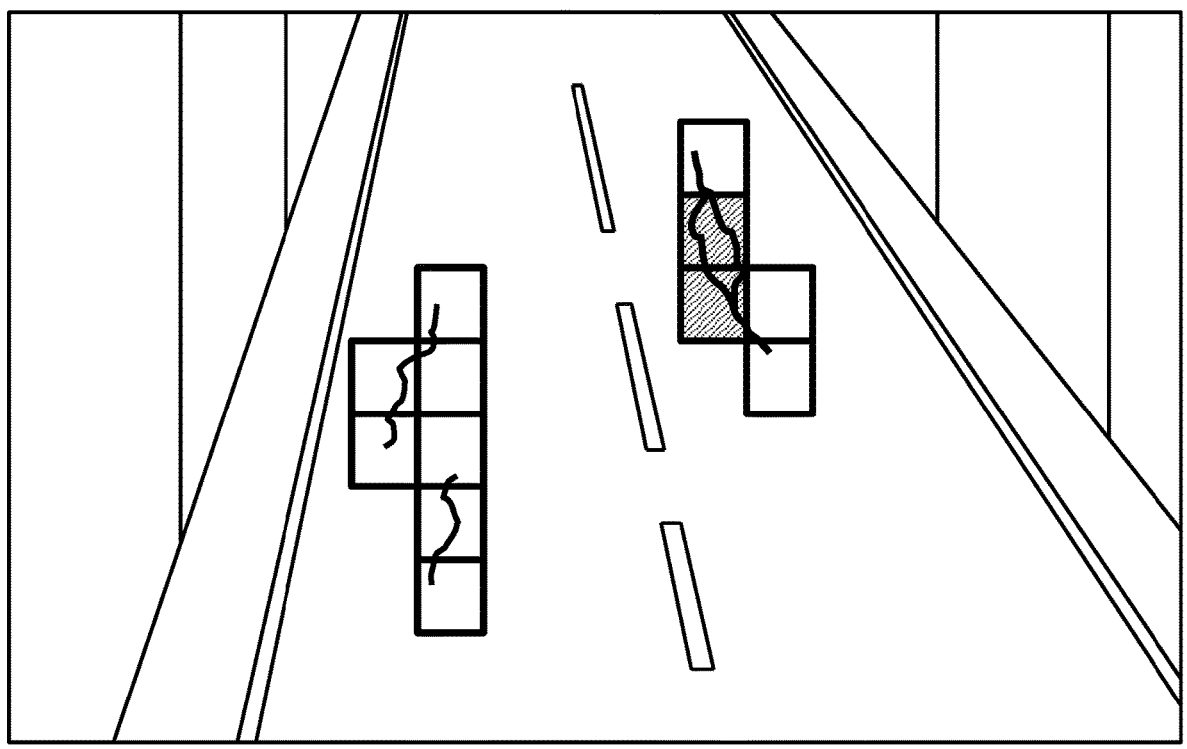
 DETERIORATION IS LARGE    DETERIORATION IS SMALL

STATE DETERMINATION DEVICE, STATE DETERMINATION METHOD AND RECORDING MEDIUM This application is a National Stage Entry of PCT/JP2020/043471 filed on Nov. 20, 2020, the contents of all of which are incorporated herein by reference, in their entirety.

TECHNICAL FIELD

The present invention relates to processing of information related to a road, and in particular, to a determination of a state of a road.

BACKGROUND ART

Management of the road responsible for local governments and the like requires a lot of effort and cost. Therefore, a device that collects road information has been proposed (see, for example, PTL 1).

The road measurement device described in PTL 1 determines deterioration of a road using image data of a surface of the road to output a map in which the deterioration and a presentation value of a reward are mapped. The road measurement device described in PTL 1 uses a determination model using image data as an input for a determination of deterioration. This determination model is constructed by a machine learning method.

CITATION LIST

Patent Literature

PTL 1: JP 2019-079166 A

SUMMARY OF INVENTION

Technical Problem

The capturing of the image of the road is outdoor imaging and imaging in various weather and time. Therefore, the captured image is an image captured under various imaging conditions.

When an image captured under various imaging conditions is to be determined using one determination model, it is difficult to ensure the accuracy of determination.

The reason will be described using weather as an example of the imaging condition.

The determination model executes learning before determination.

For example, a determination model learned using an image at the time of fine weather can appropriately determine an image at the time of fine weather. However, the determination model learned using the image at the time of fine weather cannot always appropriately determine the image captured at the time of cloudy weather and rainy weather.

Alternatively, the determination model learned using a plurality of weather images such as fine weather, cloudy weather, and rainy weather can be determined with a certain degree of accuracy with respect to the image at the time of each weather. However, even if using such a determination model, it is difficult to improve the accuracy of determination for images at the time of all weathers.

As described above, in a case where images at the time of all weathers are determined using one determination model, it is difficult to improve the accuracy of determination.

The technique described in PTL 1 uses one determination model. Therefore, the technique described in PTL 1 has an issue that it is difficult to improve the accuracy of a determination of the state regarding the road.

An object of the present invention is to provide a state determination device and the like that solve the above issue and improve the accuracy of a determination of a state regarding a road.

Solution to Problem

According to an aspect of the present invention, a state determination device includes:
a memory; and
at least one processor coupled to the memory.
The processor performs operations. The operations include:
combining output from a plurality of determination models each learned using training data in which at least one of a state of a moving object mounting an imaging device that acquires an image of the road, a state of the road, and an external environment is different.

According to an aspect of the present invention, a state determination system includes:
the state determination device described above;
an imaging device that acquires an image of a road to be determined to output the image to the state determination device, and/or a storage device that stores the image of the road to be determined; and
a display device that displays a state of the road output by the state determination device.

According to an aspect of the present invention, a state determination method includes:
by a state determination device, combining output from a plurality of determination models each learned using training data in which at least one of a state of a moving object mounting an imaging device that acquires an image of the road, a state of the road, and an external environment is different.

According to an aspect of the present invention, a state determination method includes:
by a state determination device, executing the state determination method described above,
by an imaging device, acquiring an image to be determined to output the image to the state determination device, and/or, by the storage device, storing the image to be determined; and
by a display device, displaying a state of a road output by the state determination device.

According to an aspect of the present invention, a non-transitory computer-readable recording medium embodies a program for causing a computer to perform a method. The method includes: combining output from a plurality of determination models each learned using training data in which at least one of a state of a moving object mounting an imaging device that acquires an image of the road, a state of the road, and an external environment is different.

Advantageous Effects of Invention

An example advantage according to the present invention is to improve the accuracy of a determination of a state related to a road.

BRIEF DESCRIPTION OF DRAWINGS

FIG. 2 is a diagram illustrating an example of a weight.

FIG. 16 is a view illustrating an example of display.

EXAMPLE EMBODIMENT

Figure 1:
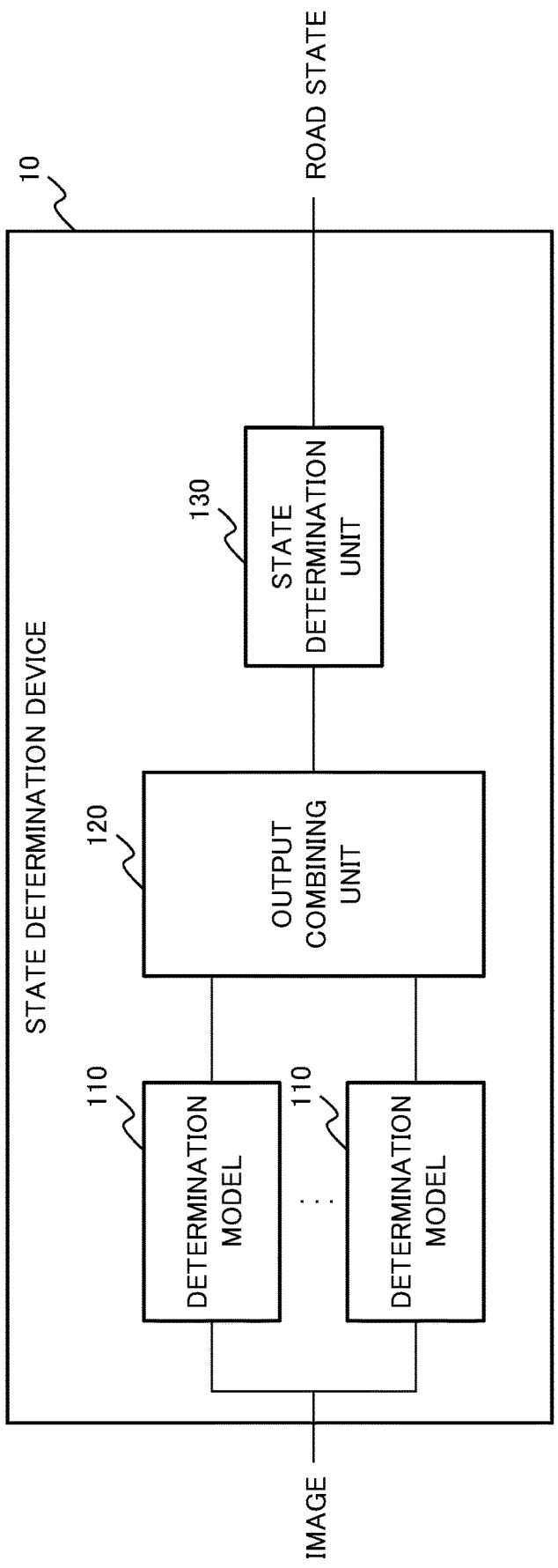
FIG. 1 is a block diagram illustrating an example of a configuration of a state determination device according to a first example embodiment.

Next, an example embodiment of the present invention will be described with reference to the drawings.

Each drawing is for describing an example embodiment. However, each example embodiment is not limited to the description of the drawings. Similar configurations in the respective drawings are denoted by the same reference numerals, and repeated description thereof may be omitted.

In the drawings used in the following description, in the description of each example embodiment, the description of portions not related to the solution of the issue of the present invention may be omitted and not illustrated.

Before the description of each example embodiment, first, terms in the following description will be organized.

A "moving object" is a moving object mounting an imaging device that captures an image of a road.

In each example embodiment, the moving object is any moving object. For example, the moving object may be a vehicle (four-wheeled vehicle or two-wheeled vehicle) or a drone in which an imaging device is installed. Alternatively, the moving object may be a person who holds and moves the imaging device.

The "state of the moving object" is a state or a feature of the moving object related to the captured image.

For example, when the type (vehicle type) of the vehicle is different, the mounting position, the angle, and the direction with respect to the traveling direction of the imaging device may be different. Therefore, the vehicle type mounting the imaging device is an example of a feature of the moving object.

Alternatively, the two-wheeled vehicle has a large change in inclination of the vehicle body as compared with the four-wheeled vehicle. Therefore, the number of wheels is an example of a feature of the moving object.

Alternatively, when the moving object is moving at a high speed, there is a case where an object in a captured image is unclear (for example, occurrence of motion blur). In the determination using such an image, the accuracy of determination decreases. That is, the speed of the moving object affects the state of the image used for determination. As described above, the movement speed of the moving object is an example of the state of the moving object.

Alternatively, the acceleration and vibration of the moving object at the time of imaging affect the captured image. Therefore, the acceleration and the vibration of the moving object are examples of the state of the moving object.

The "road" is not limited to a road through which vehicles and people pass, and includes a structure related to a road. For example, the "road" may include a sign, a white line, a guardrail, a reflecting mirror, a traffic light, and/or a light. Further, in the following description, the "road" is not limited to a road through which vehicles and persons pass, and may be a passage through which other objects pass. For example, in each example embodiment, the "road" may be a runway, a taxiway, and an apron through which an airplane passes.

The "state of the road" is a state of the road to be determined and a state of the road affecting the determination.

For example, each example embodiment may use a type of deterioration of a road, such as deterioration of a road surface (cracks (vertical, horizontal, or tortoise-shell), rutting, and/or pot holes, etc.), deterioration of a road surface seal, and fraying of a peripheral portion of the seal, as the state of the road to be determined.

The state of the road to be determined is not limited to the deterioration of the road surface. For example, each example embodiment may determine deterioration (for example, blurring of a white line of a road surface and a road surface sign and/or breakage of a sign) of a structure related to a road as a state of the road to be determined.

The state of the road to be determined is not limited to deterioration of the road and structures related to the road. For example, a white line and a road surface sign attached to a road surface are constructed in such a way as to be reflected at night. Therefore, each example embodiment may determine the reflection state of the white line and the road surface sign as the state of the road to be determined.

Alternatively, each example embodiment may determine the lighting state of the light installed on the road, the luminance of the light, or the illuminance of the road surface.

Alternatively, the classification of the road (living roads, city roads, prefectural roads, national roads, expressways, and the like) and the number of lanes affect the amount of vehicles traveling on the road surface, and the like. Therefore, each example embodiment may use the classification of the road and the number of lanes as the state of the road that affects the determination.

Alternatively, the type of pavement of the road, the shape of the material of the pavement, and the state of the road surface affect the captured image. Therefore, each example embodiment may use the type of pavement of the road, the shape of the material of the pavement, and the state of the road surface as the state of the road that affects the determination.

The type of pavement of the road is asphalt, concrete, stone, brick, gravel, or the like. The type of pavement may include a construction method of a pavement such as a drainage pavement. The material of the pavement that affects the image is grain roughness and/or color.

Alternatively, the manhole has a different appearance in the image between a sunny day and a rainy day. Alternatively, the wetness of the road surface due to rain changes the state of the captured image. Furthermore, the amount of rainfall affects the size of a puddle covering the state of the road surface. Thus, the dry and wet conditions on the surface of the road surface affect the image. The surface treatment (for example, a straight groove for drainage or a non-slip circular groove on a slope) of the road surface affects the image. That is, the dry and wet conditions of the road surface and the surface treatment affect the image. Therefore, each example embodiment may use dry and wet states of the road surface and/or surface treatment as the state of the road that affects the image.

In the following description, "road deterioration" is used as an example of the "state of road" to be determined.

The "external environment" is information obtained by excluding the state of the moving object and the state of the road from the information affecting the determination using the image of the road.

For example, the imaging condition (for example, the time zone and the weather (sunny, cloudy, rainy, after rain, snowy, etc.) of image capturing) affects determination using an image. Therefore, the external environment may include an imaging condition (for example, an imaging time zone and weather).

Alternatively, the surrounding sound at the time of imaging increases when the road is congested. The congestion of the road affects the progress of deterioration.

Alternatively, when the road surface is deteriorated, vibration associated with movement increases in a moving object such as a vehicle. Therefore, when the road surface is deteriorated, in a moving object such as a vehicle, a sound (hereinafter, referred to as "vibration sound") generated with vibration during movement is large.

Alternatively, the rainfall amount affects the captured image. The rain sound during rain is proportional to the amount of rain to some extent.

As described above, sound is one of pieces of information effective for determining deterioration of a road. Therefore, the external environment may include sound (for example, ambient sound, vibration sound, or rain sound).

Alternatively, image quality, size, and the like of an image are one of factors that affect determination. Alternatively, in the case of a moving image, the frame rate affects the image. As such, the external environment may include image specifications, such as image quality, size, and frame rate of the image.

Alternatively, a shadow or the like of a structure installed around a road may appear in an image of a road surface. Such a shadow affects determination using an image. Therefore, the external environment may include a structure (for example, advertising signboards, signs, trees around roads, and/or mid- or high-rise buildings (buildings and bridges) installed beside roads) installed around a road.

As described above, the state of the moving object, the state of the road, and the external environment include many things. Therefore, the user or the like may appropriately select information to be used as the state of the moving object, the state of the road, and the external environment in consideration of the determination target.

In the following description, terms related to weather are as follows. However, these terms may be different from weather terms in a strict sense. In a case where the user classifies images to be applied to the model, the determination may be appropriately made in consideration of operational effectiveness and convenience.

The "fine weather" includes "clear weather" in which the cloud amount in the sky is one or less and "sunny weather" in which the cloud amount is 2 or more and 8 or less.

"Cloudy weather" is weather with the cloud amount being nine or more and no precipitation.

"Rainy weather" is weather with rain.

The cloud amount is a ratio of cloud covering the sky, and is an integer of 0 when there is no cloud and 10 when the clouds cover the whole sky.

First Example Embodiment

Next, a first example embodiment will be described with reference to the drawings.
Description of Configuration First, a configuration of a state determination device 10 according to the first example embodiment will be described with reference to the drawings.

FIG. 1 is a block diagram illustrating an example of a configuration of the state determination device 10 according to the first example embodiment.

The state determination device 10 includes a plurality of determination models 110, an output combining unit 120, and a state determination unit 130. The number of determination models 110 included in the state determination device 10 is not particularly limited as long as it is plural.

The determination model 110 includes a model that determines the state of the road using the input image of the road. For example, the determination model 110 outputs the position of deterioration of the road and the score thereof using the image of the road.

The determination model 110 is a learned model learned in advance using artificial intelligence (AI) or machine learning. For example, the determination model 110 is a learned model in which the state of the road is learned using training data including an image obtained by imaging the road and a correct answer label of the state of the road using a method such as AI or machine learning.

In the following description, a stage of learning the model (for example, the determination model 110) using the training data is referred to as a "learning phase".

A stage of inputting an image of a road to be determined, determining a state of the road (for example, the location and score of road degradation) using a learned model (for example, the determination model 110), and outputting a result of the determination is referred to as an "determination phase".

That is, the determination model 110 is a learned model learned for the determination in the learning phase before operating in the actual determination phase.

At least some of the determination models 110 may have a structure different from those of other determination models 110. For example, at least some of the determination model 110 may include a neural network having a structure different from those of other determination models 110. However, all the determination models 110 may have the same structure.

The learning phase of the plurality of determination models 110 illustrated in FIG. 1 will be described.

In the learning phase, the determination models 110 are learned for the determination of the state of the road using training data including images in which at least one of the state of the moving object, the state of the road, and the external environment is mutually different.

For example, the training data may be different from each other in the state of the moving object. Alternatively, the training data may be different from each other in the state of the road. Alternatively, the training data may be different from each other in the external environment. Alternatively, the training data may be different from each other in any two of the state of the moving object, the state of the road, and the external environment. Alternatively, the training data may be different from each other in all of the state of the moving object, the state of the road, and the external environment.

For three or more pieces of training data, the points in which the images are different may be different. For example, certain training data may be different from another training data in the state of the moving object, and may be different from different another training data in the state of the road.

The determination model 110 is a learned model learned using mutually different training data in this manner.

Then, in the learning phase, the determination models 110 are learned for the determination of the state of the road using the training data including images in which at least one of the state of the moving object, the state of the road, and the external environment is mutually different as described above.

For example, in the learning phase, a certain determination model 110 is learned for the determination of the situation of the road using training data including an images in which the state of the moving object is different. Then, in the learning phase, another determination model 110 is learned for the determination of the state of the road using training data including an image in which the external environment is different.

For example, before learning is executed, the user of the state determination device 10 prepares, as the training data, a plurality of pieces of training data including images in which at least one of the state of the moving object, the state of the road, and the external environment is mutually different. For example, each group in which the images prepared as the training data by the user are divided into groups in which at least one of the state of the moving object, the state of the road, and the external environment is mutually different and labeled may be used as the training data.

When at least some images included in training data are mutually different from other images included the training data, some images included in the training data may be the same as other images.

The amount of images used for the training data may be the same for each group, or the amount of images of the training data of at least some groups may be different from the amount of images of the training data of other groups.

For example, the state determination device 10 executes the learning phase of the determination model 110 in such a way that respective determination models 110 learns using mutually different training data.

The state determination device 10 determines that the learning timing of each determination model 110 is any timing. For example, the state determination device 10 may execute learning of the determination model 110 continuously or in parallel. Alternatively, the state determination device 10 may discretely execute learning of at least some of the determination models 110.

A device different from the state determination device 10 may execute at least part of the learning of the determination model 110. For example, the state determination device 10 may acquire the learned determination model 110 from another device (not illustrated) as at least some of the determination models 110.

In a case where all the learned determination models 110 are acquired from another device, the state determination device 10 may not include the function of the learning phase.

Furthermore, the state determination device 10 may execute additional learning of at least some of the determination models 110.

As described above, the state determination device 10 includes the plurality of determination models 110 each learned using training data including images in which at least one of the state of the moving object, the state of the road, and the external environment is mutually different.

In the following description, it is assumed that the determination model 110 has been learned except for the description of the learning phase in the determination model 110.

In the determination phase, the determination model 110 determines the state of the road using the input image obtained by imaging the road to output the determined state of the road, specifically, the deterioration of the road and the score thereof to the output combining unit 120.

The output combining unit 120 acquires output from the plurality of determination models 110. Then, the output combining unit 120 combines output of the plurality of determination models 110 using a predetermined method.

For example, the output combining unit 120 may store a weight for the output of each of the plurality of determination models 110 in advance, and combine output of the determination models 110 using the stored weights.

An example of a combining operation using weights will be described.

The output combining unit 120 stores a weight for each determination model 110 in advance. Then, the determination model 110 outputs the deterioration position of the road and the score thereof using, for example, AI for object detection. In this case, the output combining unit 120 outputs, as a result of a combination, a result obtained by multiplying the deterioration position output by the determination model 110 and the score thereof by a weight for each of the determination models 110 and then combining them.

The output combining unit 120 may store a plurality of weights as weights for each determination model 110 instead of one weight. For example, the output combining unit 120 may store a plurality of weights (for example, weights for fine weather, cloudy weather, and rainy weather) related to the state of the image to be determined at the time of imaging (for example, weather).

An example in which the output combining unit 120 uses a plurality of weights will be described.

It is assumed that the state determination device 10 includes the following three models as the determination model 110.

(1) The determination model 110 learned using training data of fine weather (hereinafter, "fine weather model");

(2) The determination model 110 learned using training data of cloudy weather (hereinafter, "cloudy weather model"); and (3) The determination model 110 learned using training data of rainy weather (hereinafter, "rainy weather model").

Then, the output combining unit 120 determines the weight using the cloud amount and the precipitation amount.

FIG. 2 is a diagram illustrating an example of a weight.

The output combining unit 120 stores the weight illustrated in FIG. 2 in advance. Then, the output combining unit 120 combines output of the determination model 110 as follows.

The output combining unit 120 acquires the cloud amount and the precipitation amount of the image to be determined. For example, the output combining unit 120 acquires the cloud amount and the precipitation amount from the transmission source of the image to be determined or the like.

A method of acquiring the precipitation amount and the precipitation amount by the output combining unit 120 is any method. For example, the output combining unit 120 may acquire an imaging position and an imaging date and time of an image, and acquire a cloud amount and a precipitation amount at the acquired position and date and time from a company or the like that provides weather data. Alternatively, the output combining unit 120 may estimate the cloud amount and the precipitation amount using measurement data of a sensor (for example, an illuminance sensor and a humidity sensor) mounted on the moving object. Alternatively, the output combining unit 120 may estimate the cloud amount and the precipitation amount by applying a predetermined image analysis method to the image to be determined.

Then, the output combining unit 120 selects, as the weight for the determination model 110, a weight to be used for combination from the weights illustrated in FIG. 2 based on the cloud amount and the precipitation amount when the image to be determined is captured.

A field of "-" in FIG. 2 indicates that it is not considered in the selection of the weight. For example, in a case where the cloud amount is 1 to 8, the output combining unit 120 determines the weight without considering the precipitation amount. The output combining unit 120 compares the precipitation amount with a predetermined threshold value to determine the precipitation amount.

For example, when the cloud amount is 6, the output combining unit 120 selects "0.7" as the weight for the fine weather model, "0.3" as the weight for the cloudy weather model, and "0.0" as the weight for the rainy weather model.

Then, the output combining unit 120 combines output of the fine weather model, the cloudy weather model, and the rainy weather model using the weight.

In this manner, the output combining unit 120 combines the results of a determination by the plurality of determination models 110 using a predetermined method.

In FIG. 2, the weight "0.0" of the rainy weather model when the cloud amount is 6 means that the output combining unit 120 does not use the output of the rainy weather model for combination. In this manner, the output combining unit 120 may not combine output of some of the determination models 110.

In a case where the total of the weights is not "1", the output combining unit 120 may calculate a value (that is, the weighted average value) obtained by dividing the added value as a result of a combination by the number of determination models 110.

Alternatively, in a case where the accuracy of a determination by the determination model 110 is different, the output combining unit 120 may use a weight in consideration of the accuracy of a determination by the determination model 110.

In this manner, the output combining unit 120 combines output (determination results) of the plurality of determination models 110 using a predetermined method.

However, the method of combining the outputs is not limited to the above, and may be any method. The user of the state determination device 10 may select a method of combining output based on knowledge or the like.

For example, the output combining unit 120 may output, as the "deterioration position", a position determined as the deterioration position by the determination models 110 whose number is more than the threshold value as a result of a combination.

Alternatively, the output combining unit 120 may use a combination method learned using AI.

The description returns to the description with reference to FIG. 1.

The output combining unit 120 outputs the addition result to the state determination unit 130.

The state determination unit 130 determines the state of the road in the image to be determined based on a result of the combination by the output combining unit 120.

Each determination model 110 determines the state of the road. Therefore, the result of a combination by the output combining unit 120 is the determination of the state of the road. Therefore, the user of the state determination device 10 may use the result of a combination by the output combining unit 120.

However, the state of the road required by the user may be a state determined using the result of a combination in addition to the result of a combination.

For example, in a case where the determination model 110 outputs the position and type of deterioration, the result of a combination by the output combining unit 120 is the position and type of deterioration. Therefore, the user can grasp the position and type of deterioration.

However, for example, when determining necessity of repair, the user needs the degree of deterioration in addition to the position and type of deterioration. Therefore, the state determination unit 130 may determine the degree of deterioration (hereinafter, referred to as "deterioration") based on the output position and type of deterioration as the state of the road. In this manner, the state determination unit 130 determines the state of the road using the result of a combination by the output combining unit 120.

A method of determining the state of the road in the state determination unit 130 is any method. For example, the state determination unit 130 may determine the state of the road using a general image processing method.

The state determination unit 130 may include the information (for example, the location and type of degradation) acquired from the output combining unit 120 in the state of the road to be output.

Then, the state determination unit 130 outputs the state of the road, which is the result of the determination, to a predetermined device. For example, the state determination unit 130 outputs the determination result to a device that displays the state of the road.

The state determination unit 130 may store the state of the road as a result of the determination in a predetermined storage device.

The state determination unit 130 may output an image used for determination in addition to the state of the road.

The state determination device 10 may determine the state of the road using a plurality of images (a plurality of still images or moving images) instead of one image.

Description of Operation

Next, an operation related to the state determination device 10 will be described with reference to the drawings.

(1) Learning Phase

First, the operation in the learning phase of the determination model 110 will be described.

Figure 3:
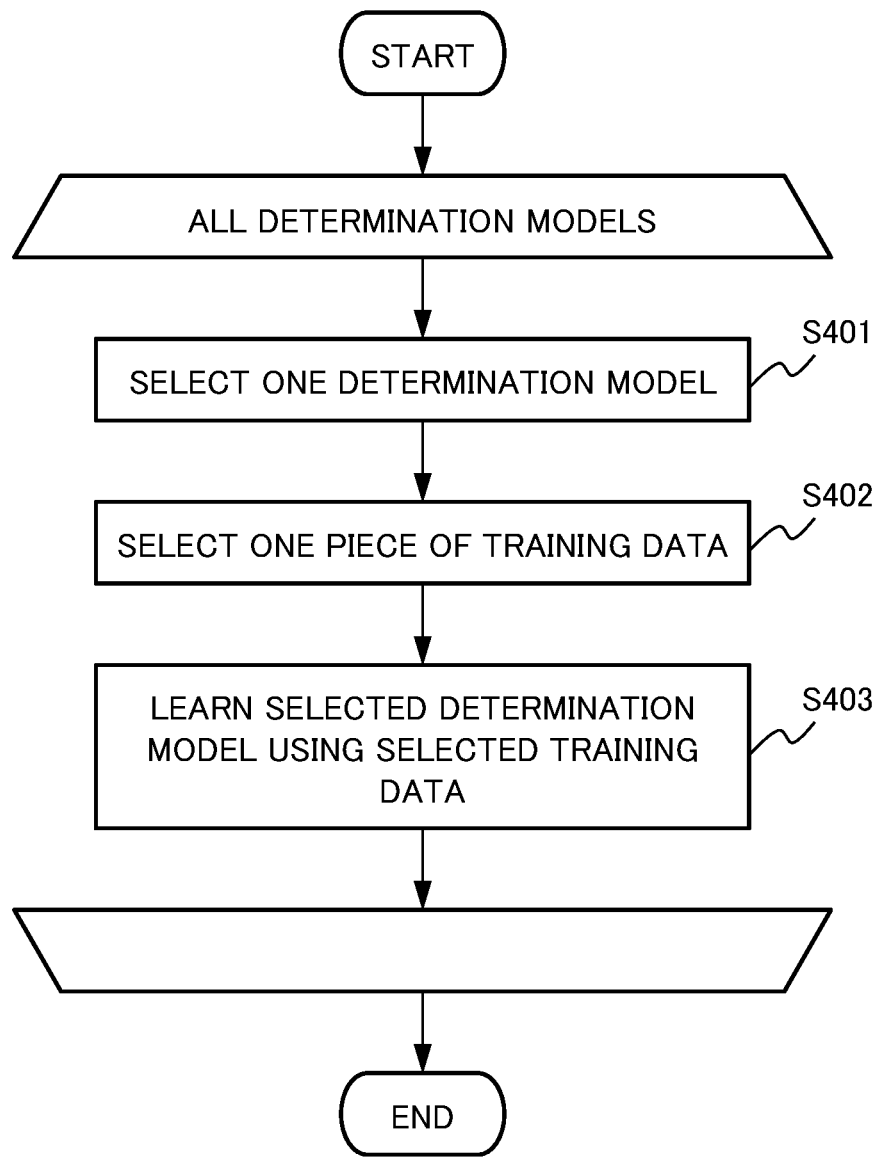
FIG. 3 is a flowchart illustrating an example of operation in a learning phase of a determination model.

FIG. 3 is a flowchart illustrating an example of the operation in the learning phase of the determination model 110.

It is assumed that the state determination device 10 has previously acquired a plurality of pieces of training data in which at least one of the state of the moving object mounting the imaging device that acquires the image of the road, the state of the road, and the external environment is different.

The state determination device 10 executes the following operation on all the determination models 110.

First, the state determination device 10 selects one determination model 110 from the unlearned determination models 110 (step S401).

The state determination device 10 selects one piece of training data from training data that is not used for learning (step S402).

Then, the state determination device 10 executes learning of the selected determination model 110 using the selected training data (step S403). The determination model 110 may use general machine learning as learning.

The state determination device 10 repeats the above operation until there is no unlearned determination model 110.

(2) Determination Phase

Next, the operation in the determination phase in the state determination device 10 will be described.

Figure 4:
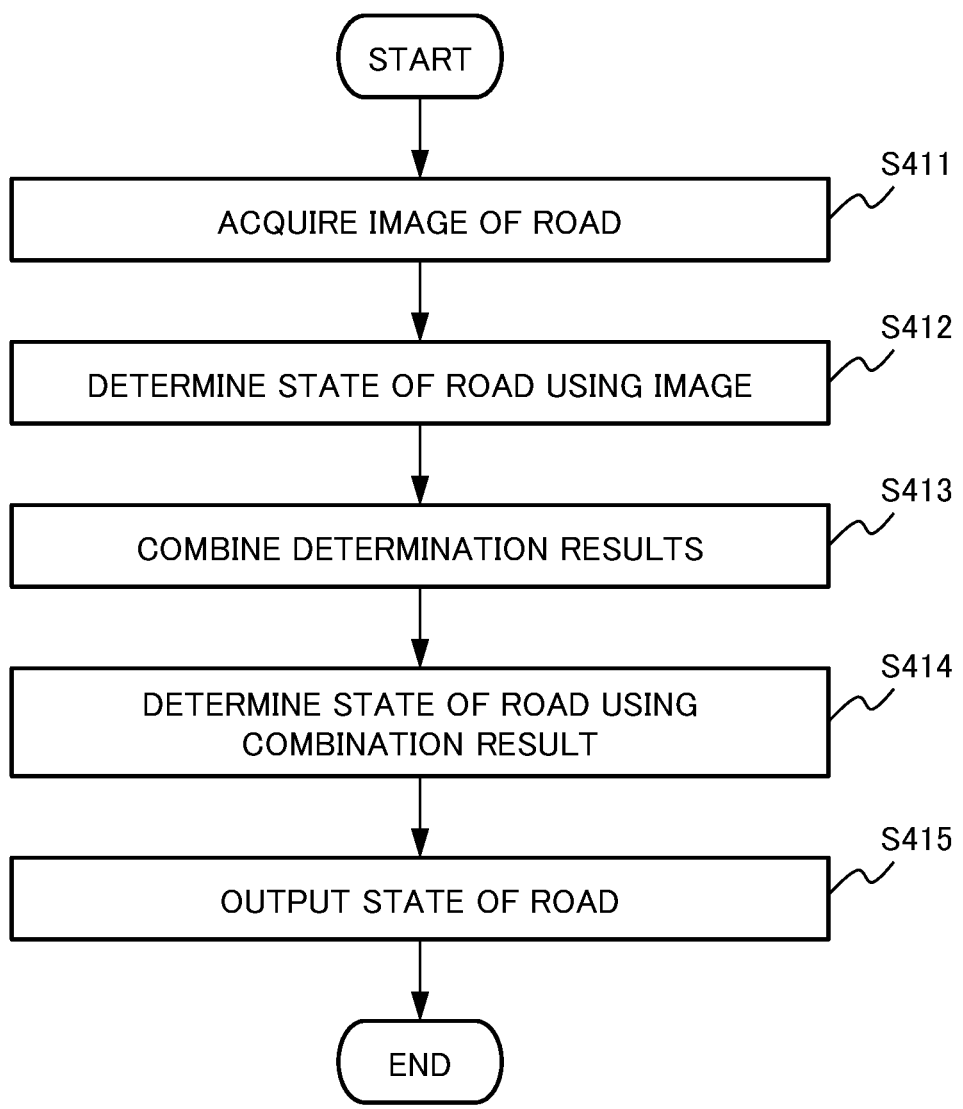
FIG. 4 is a flowchart illustrating an example of an operation in a determination phase of the state determination device according to the first example embodiment.

FIG. 4 is a flowchart illustrating an example of the operation in the determination phase of the state determination device 10 according to the first example embodiment.

The determination model 110 has been learned in the determination phase.

The state determination device 10 acquires an image of a road to be determined from a predetermined device (step S411). For example, the state determination device 10 acquires an image of a road captured by an imaging device (not illustrated). Alternatively, the state determination device 10 acquires an image of a road stored in a storage device (not illustrated).

Then, each determination model 110 determines the state of the road using the image of the road (step S412). For example, each determination model 110 determines road deterioration (for example, the location and type of degradation). Then, the determination model 110 outputs the determination result to the output combining unit 120.

The output combining unit 120 combines output (determination results) of the determination model 110 (step S413). Then, the output combining unit 120 outputs the combined result to the state determination unit 130.

The state determination unit 130 determines the state of the road (for example, the deterioration) using the result of the combination by the output combining unit 120 (step S414).

Then, the state determination unit 130 outputs the state of the road (for example, the deterioration) to a predetermined device (step S415). The state determination unit 130 may include the result of a combination by the output combining unit 120 (for example, the location and type of degradation) in the state of the road.

Description of Effects

Next, effects of the state determination device 10 according to the first example embodiment will be described.

The state determination device 10 according to the first example embodiment can obtain effects of improving the accuracy of determination of a state related to a road.

The reason is as follows.

The state determination device 10 includes the plurality of determination models 110 and the output combining unit 120. The determination models 110 are determination models each learned using training data in which at least one of the state of the moving object mounting the imaging device that acquires the image of the road, the state of the road, and the external environment is different. The output combining unit 120 combines output from the plurality of determination models for the input image of the road.

As described above, the state determination device 10 combines the results of a determination by the plurality of determination models 110 that has been learned using the training data in which the states of the mobile bodies and the like are different. Therefore, the state determination device 10 can improve the accuracy of determination on the input image of the road.

As an example, a case related to weather will be described.

The "fine weather" includes a cloud amount of up to 8. On the other hand, the "cloudy weather" has a cloud amount of 9 or more. However, the actual cloud amount may be a cloud amount of between 8 and 9. In the determination in such a case, it is assumed that the determination in accordance with the actual cloud amount is made when using the result of a determination by both models rather than using the result of a determination by either the fine weather model or the cloudy weather model.

As described above, depending on the weather, the accuracy of a determination of the state of the road can be improved by considering the output of the plurality of determination models 110.

Therefore, the output combining unit 120 combines the results of a determination by the plurality of determination models 110 using a predetermined method (for example, a weight). Therefore, the result of a combination by the output combining unit 120 is a determination with higher accuracy than that of a determination by one model.

The state determination device 10 further includes the state determination unit 130. The state determination unit 130 determines and output the state of the road based on a result of the combination by the output combining unit 120. As a result, the state determination unit 130 determines the state of the road using a result obtained by combining the determinations by the plurality of determination models 110, that is, a more accurate result.

Therefore, the state determination device 10 can improve the accuracy of a determination of the state related to the road as compared with the determination using one determination model.

The determination models 110 may have different accuracies. In such a case, simply using any one of the plurality of determination models 110 for determination cannot ensure the accuracy of determination.

For example, a device using any one of the models (hereinafter, referred to as a "related device") includes a fine weather model, a cloudy weather model, and a rainy weather model. Then, it is assumed that the related device selects and determines a model in accordance with the weather.

However, for example, it is assumed that the accuracy of the rainy weather model is lower than the accuracy of each of the fine weather model and the cloudy weather model.

In this case, the related device uses the rainy weather model for the image of the rain. Therefore, the related device cannot ensure the accuracy of determination in rainy weather.

Meanwhile, the state determination device 10 includes the output combining unit 120. Then, the output combining unit 120 may combine the output in consideration of the accuracy of each of the plurality of determination models 110. Therefore, even in a case where the accuracy of some of the determination models 110 is low, the state determination device 10 can improve the accuracy of determination using the result obtained by combining the results of a determination by other determination models 110.

Hardware Configuration

Next, a hardware configuration of the state determination device 10 will be described.

Each component of the state determination device 10 may be configured by a hardware circuit.

Alternatively, in the state determination device 10, each component may be configured using a plurality of devices connected via a network. For example, the state determination device 10 may be configured using cloud computing.

Alternatively, in the state determination device 10, the plurality of components may be configured by one piece of hardware.

Alternatively, the state determination device 10 may be achieved as a computer device including a central processing unit (CPU), a read only memory (ROM), and a random access memory (RAM). In addition to the above configuration, the state determination device 10 may be implemented as a computer device including a network interface circuit (NIC).

Figure 5:
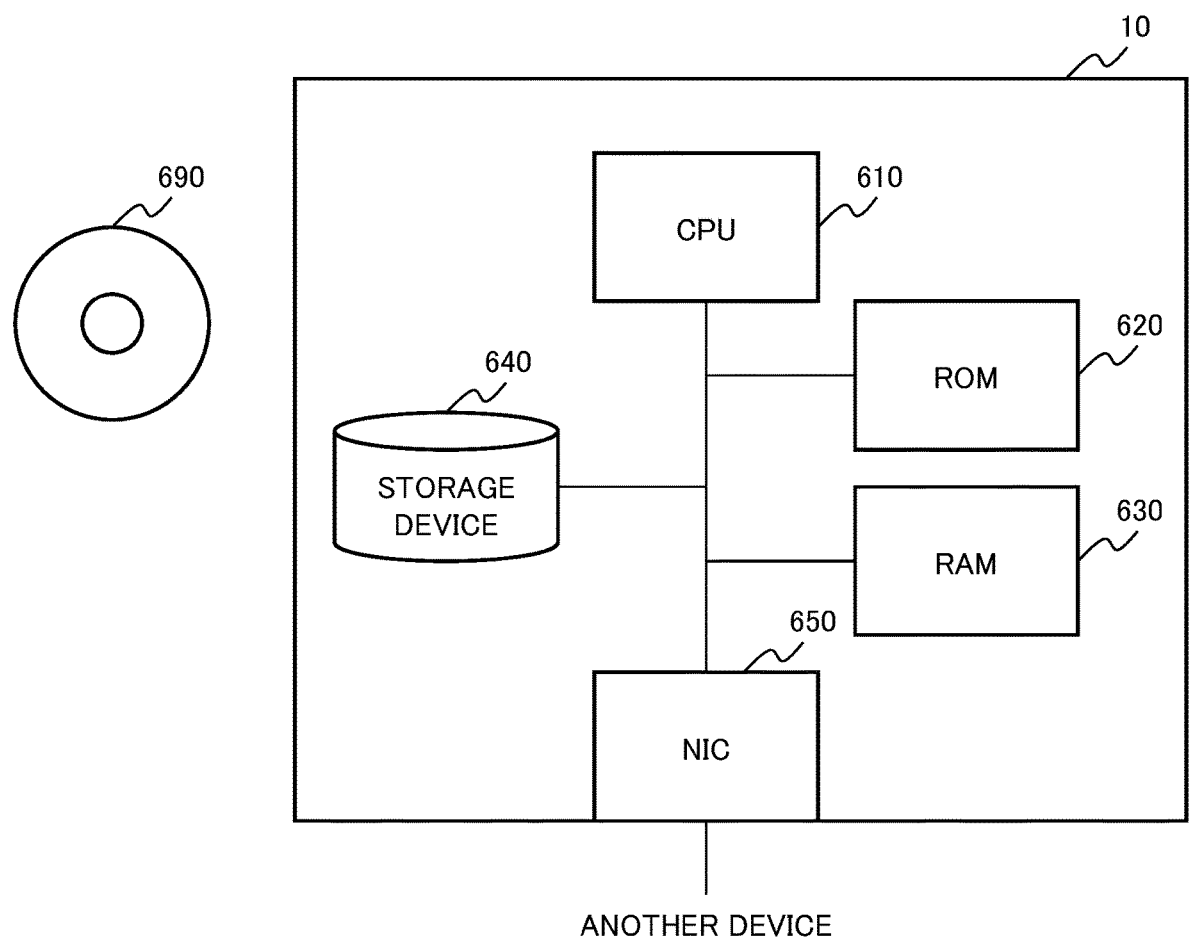
FIG. 5 is a block diagram illustrating an example of a hardware configuration of the state determination device.

FIG. 5 is a block diagram illustrating an example of a hardware configuration of the state determination device 10.

The state determination device 10 includes a CPU 610, a ROM 620, a RAM 630, a storage device 640, and an NIC 650, and thus is implemented as a computer device.

The CPU 610 reads a program from the ROM 620 and/or the storage device 640. Then, the CPU 610 controls the RAM 630, the storage device 640, and the NIC 650 based on the read program. Then, the computer including the CPU 610 controls these configurations to achieve the functions as the determination model 110, the output combining unit 120, and the state determination unit 130 illustrated in FIG. 1.

When achieving each function, the CPU 610 may use the RAM 630 or the storage device 640 as a temporary storage medium of the program.

The CPU 610 may read the program included in a recording medium 690 storing the program in a computer readable manner using a recording medium reading device (not illustrated). Alternatively, the CPU 610 may receive a program from an external device (not illustrated) via the NIC 650, store the program in the RAM 630 or the storage device 640, and operate based on the stored program.

The ROM 620 stores programs executed by the CPU 610 and fixed data. The ROM 620 is, for example, a programmable ROM (P-ROM) or a flash ROM.

The RAM 630 temporarily stores programs and data executed by the CPU 610. The RAM 630 is, for example, a dynamic-RAM (D-RAM).

The storage device 640 stores data and programs to be stored for a long period of time by the state determination device 10. The storage device 640 may operate as a temporary storage device of the CPU 610. The storage device 640 is, for example, a hard disk device, a magneto-optical disk device, a solid state drive (SSD), or a disk array device.

The ROM 620 and the storage device 640 are non-transitory recording media. On the other hand, the RAM 630 is a transitory recording medium. The CPU 610 can operate based on a program stored in the ROM 620, the storage device 640, or the RAM 630. That is, the CPU 610 can operate using a non-transitory recording medium or a transitory recording medium.

The NIC 650 relays exchange of data with an external device (for example, the transmission source of the image for determination and the output destination device of the state of the road) not illustrated via a network. The NIC 650 is, for example, a local area network (LAN) card. Furthermore, the NIC 650 is not limited to use wired communication, but may use wireless communication.

The state determination device 10 of FIG. 5 configured as described above can obtain the effects same as those of the state determination device 10 of FIG. 1.

This is because the CPU 610 of the state determination device 10 in FIG. 5 can implement each function of the state determination device 10 in FIG. 1 based on the program.

System Configuration

Figure 6:
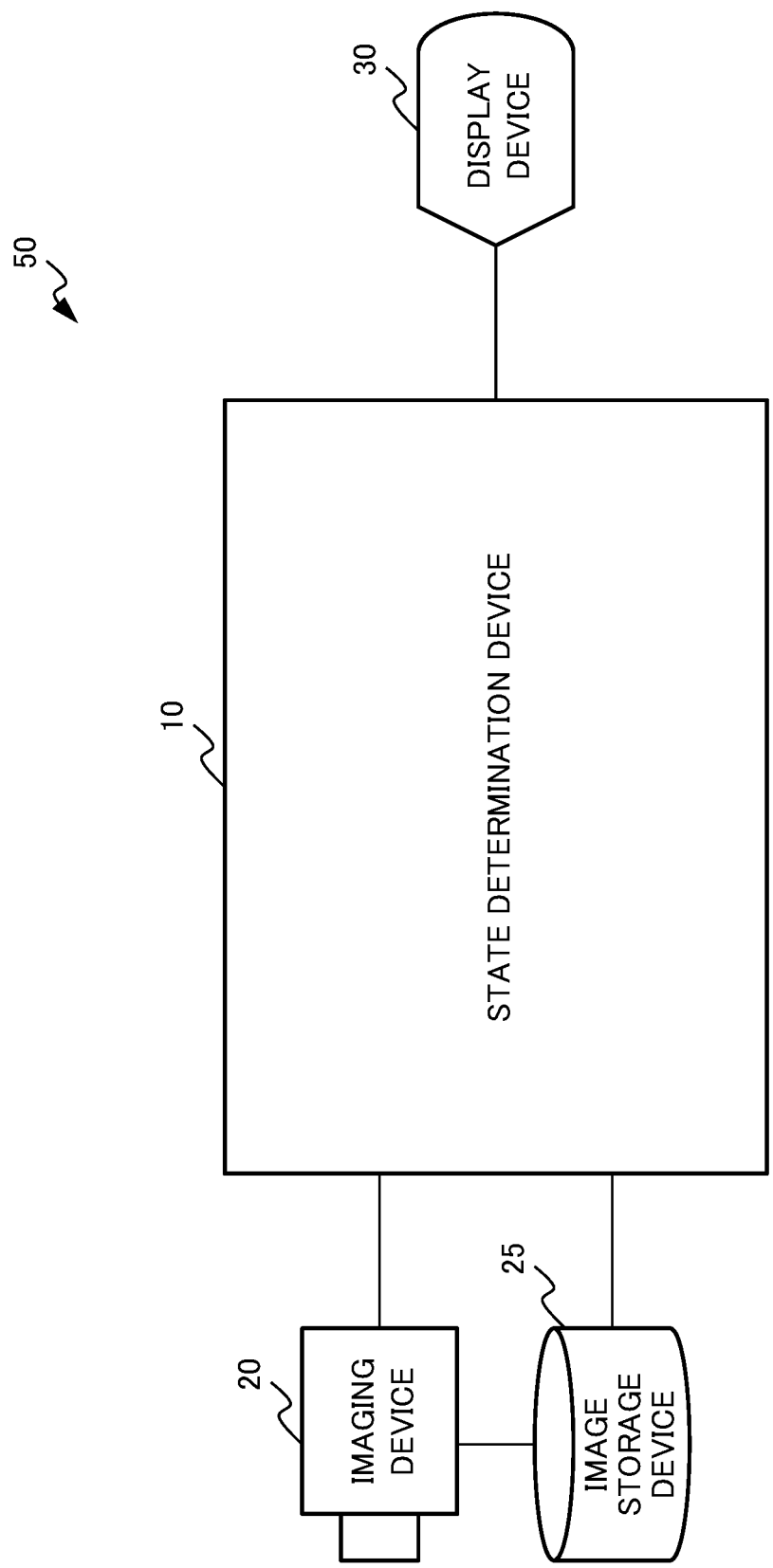
FIG. 6 is a block diagram illustrating an example of a configuration of a state determination system including the state determination device according to the first example embodiment.

FIG. 6 is a block diagram illustrating an example of a configuration of a state determination system 50 including the state determination device 10 according to the first example embodiment.

The state determination system 50 includes the state determination device 10, an imaging device 20 and/or an image storage device 25, and a display device 30.

The imaging device 20 is mounted on a moving object, acquires training data and/or an image to be determined, and outputs the training data and/or the image to the state determination device 10. Alternatively, the imaging device 20 may acquire training data and/or an image to be determined, and store the training data and/or the image to be determined in the image storage device 25. The imaging device 20 is, for example, a camera or a drive recorder.

The number of imaging devices 20 may be one or plural.

Figure 15:
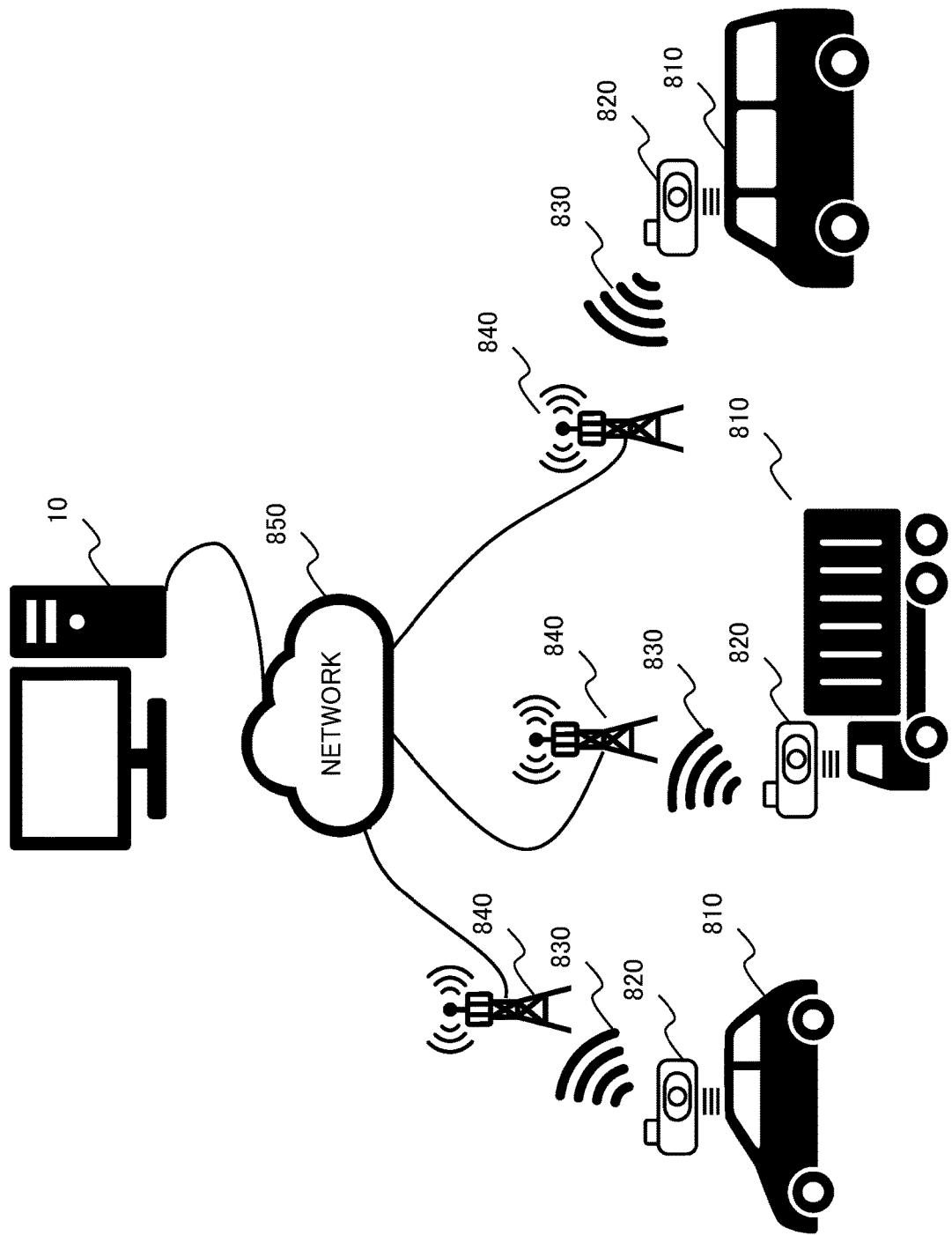
FIG. 15 is a view illustrating an example in a case where a plurality of drive recorders is used as an imaging device.

FIG. 15 is a diagram illustrating an example of a case where a plurality of drive recorders 820 is used as the imaging device. FIG. 15 illustrates a vehicle 810 as an example of the moving object.

A network 850 is a communication path connected to the state determination device 10.

A wireless communication path 830 connects the drive recorder 820 and a radio base station 840.

The radio base station 840 relays the network 850 to which the state determination device 10 is connected and the wireless communication path 830.

The vehicle 810 mounts the drive recorder 820 and travels on a road.

The drive recorder 820 is mounted on the vehicle 810, and captures an image of a road on which the mounted vehicle 810 travels. FIG. 15 illustrates the drive recorder 820 adjacent to the outside of the vehicle 810 for easy understanding.

Then, the drive recorder 820 transmits the captured image to the state determination device 10 via the wireless communication path 830, the radio base station 840, and the network 850. The wireless communication path 830, the radio base station 840, and the network 850 are an example of a communication path between the drive recorder 820 and the state determination device 10. The drive recorder 820 may be connected to the state determination device 10 by a device or a path different from that in FIG. 15.

The vehicle 810, the drive recorder 820, the wireless communication path 830, the radio base station 840, and the network 850 are not particularly limited. The vehicle 810, the drive recorder 820, the wireless communication path 830, the radio base station 840, and the network 850 may be generally sold products. Therefore, a detailed description thereof will be omitted.

The state determination device 10 may be mounted on a moving object. In this case, the state determination device 10 may acquire the determination image from the imaging device 20 directly or via the communication path in the moving object.

The description returns to the description with reference to FIG. 6.

The image storage device 25 stores training data and/or an image to be determined. Then, the image storage device 25 outputs the training data and/or the image to be determined to the state determination device 10. The image storage device 25 is, for example, a hard disk device, a magneto-optical disk device, an SSD, or a disk array device.

The image storage device 25 receives training data and/or an image to be determined from the imaging device 20. However, the image storage device 25 may receive training data and/or an image to be determined from a device (not illustrated) different from the imaging device 20.

Whether the state determination device 10 acquires the training data and the image to be determined from the imaging device 20 or the image storage device 25 may be appropriately determined by the user. For example, the state determination device 10 may acquire training data from the image storage device 25 and acquire the image to be determined from the imaging device 20.

The state determination device 10 operates as described above, and executes the learning phase using the training data.

Further, the state determination device 10 operates as described above, determines the state of the road using the image to be determined, and outputs the determined state of the road as the determination phase.

The display device 30 displays the result (state of road) of the determination output by the state determination device 10. The display device 30 is, for example, a liquid crystal display, an organic electroluminescence display, or electronic paper.

The display on the display device 30 is any display. The user may appropriately display the state of the road on the display device 30 as necessary.

FIG. 16 is a diagram illustrating an example of display.

FIG. 16 illustrates a deterioration position using a rectangular frame in the image of the road to be determined. Further, FIG. 16 highlights (hatched) the position where the state determination device 10 has determined as "deterioration is large".

The display device 30 may collectively display not one but a plurality of states of the road as the display of the state of the road determined by the state determination device 10.

Figure 17:
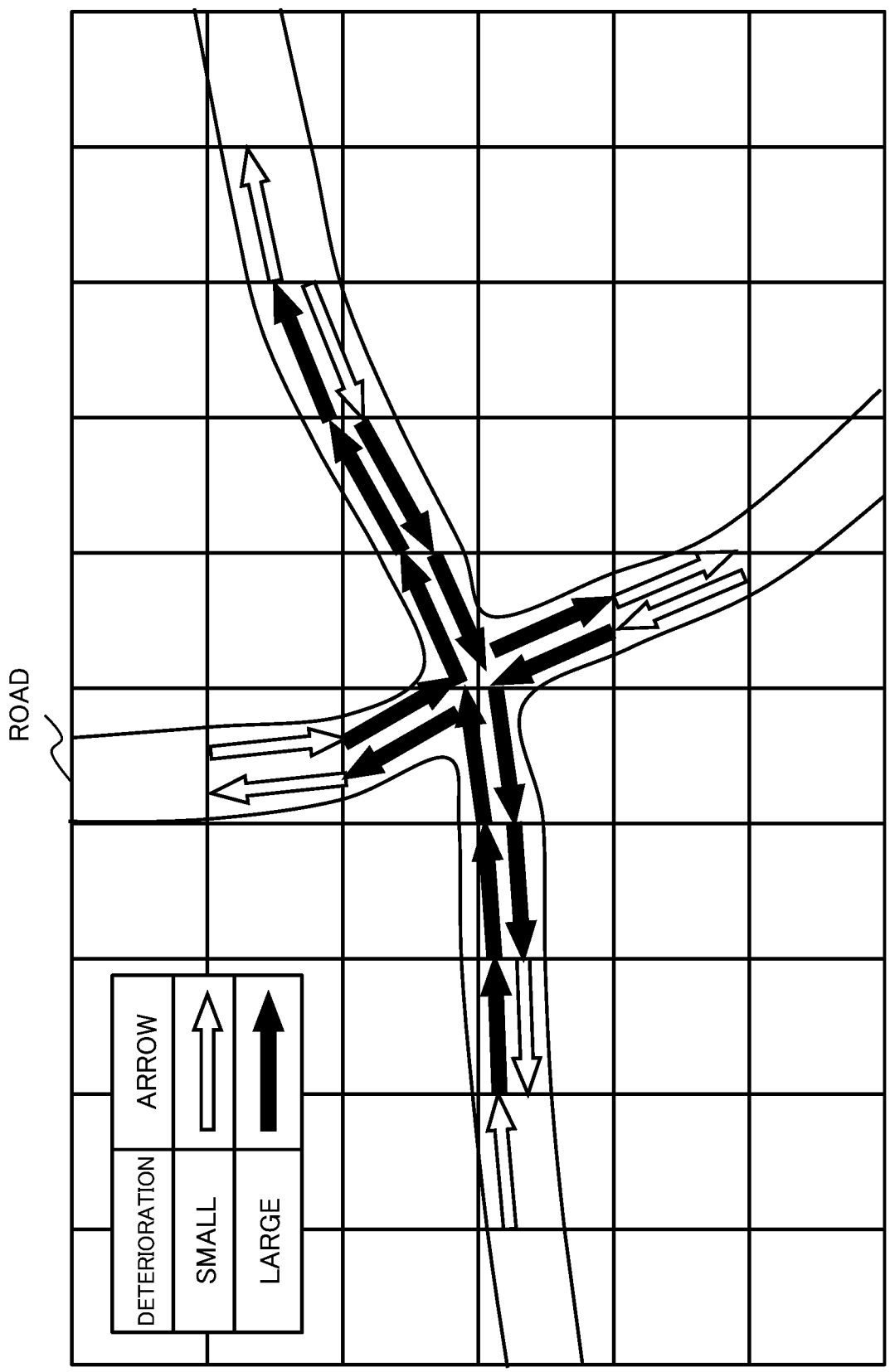
FIG. 17 is a view illustrating an example of display of a plurality of states.

FIG. 17 is a diagram illustrating an example of display of a plurality of states.

FIG. 17 illustrates a portion determined to be deteriorated on a road in a predetermined region using an arrow. Further, FIG. 17 highlights (in black) the "large deterioration". The direction of the arrow in FIG. 17 is the traveling direction of the vehicle on the road.

Second Example Embodiment

Next, a second example embodiment will be described in detail with reference to the drawings.

Description of Configuration

Figure 7:
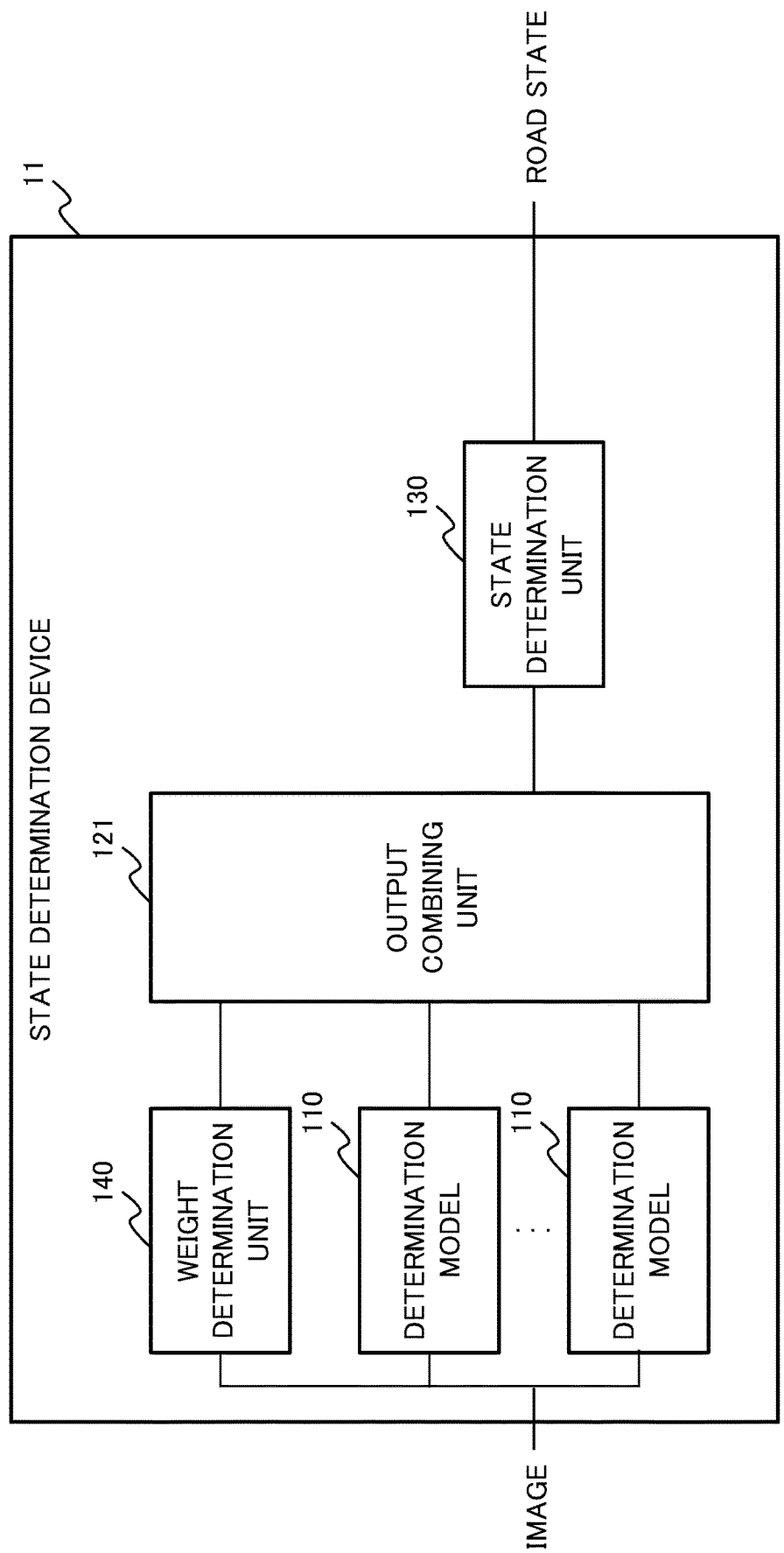
FIG. 7 is a block diagram illustrating an example of a configuration of a state determination device according to a second example embodiment.

FIG. 7 is a block diagram illustrating an example of a configuration of a state determination device 11 according to the second example embodiment.

The state determination device 11 includes a plurality of determination models 110, an output combining unit 121, a state determination unit 130, and a weight determination unit 140. The determination model 110 and the state determination unit 130 are similar to the determination model 110 and the state determination unit 130 of the first example embodiment. Therefore, a detailed description thereof will be omitted.

The state determination device 11 may be configured using a computer illustrated in FIG. 5. Alternatively, the state determination system 50 may include the state determination device 11 instead of the state determination device 10.

The output combining unit 121 combines the results of a determination by the determination model 110 using the weight determined by the weight determination unit 140. For example, when the state determined by the determination model 110 is the deterioration position and the score, the output combining unit 121 combines the deterioration position and the score output by the determination model 110 using the weight determined by the weight determination unit 140.

The output combining unit 121 operates as in the output combining unit 120 of the first example embodiment except that the weight determined by the weight determination unit 140 is used.

The weight determination unit 140 determines a weight to be used when the output combining unit 121 combines the determination models 110 using the image to be determined.

Therefore, the weight determination unit 140 stores a mechanism (for example, an equation for calculating a weight or a determinant) for determining the weight using the image in advance. In the following description, a mechanism for determining a weight is referred to as a "weight determination formula". However, the weight determination formula is not limited to a simple scalar formula. For example, the weight determination formula may be an equation, a vector formula, a determinant, a function, or a combination thereof. The weight determination formula may include a function including a conditional statement.

An operation of the weight determination unit 140 will be described using a simple example.

For example, the following Equation (1) is a weight determination formula representing combination by the output combining unit 121.

$$Y=a_i(p)X_i(p)+a_2(p)X_2(p)+ \ldots +a_n(p)X_n(p) \quad (1)$$

In the above Equation (1), p is an image to be determined (Specifically, for example, the value of the pixel of the image). n is the number of determination models 110. i is a variable indicating the determination model 110 (i=1, ..., n). Y is the result of a combination. $a_i(p)$ (i=1, ..., n) is a function that determines a weight for each determination model 110 in the case of the image p. $X_i(p)$ (i=1, 2, ..., n) is output of the determination model 110.

A data format such as a variable in Equation (1) may be appropriately selected from a scalar, a vector, a matrix, a function, or a combination thereof. The coefficient of the function $a_i(p)$ is an example of the parameter of the weight determination formula.

In this case, the weight determination unit 140 determines the weight by applying the image p to the function $a_i(p)$. The determination model 110 calculates "$X_i(p)$", which is a result of the determination, using the image p. Then, the output combining unit 120 calculates "Y", which is a result of a combination, using the weight ($a_i(p)$) determined by the weight determination unit 140 and the result of the determination ($X_i(p)$) output by the determination model 110.

The weight determination formula is stored in advance in the state determination device 11.

The configuration for storing the weight determination formula is any configuration. The state determination device 11 may store the weight determination formula in a storage unit (not illustrated). In this case, the weight determination unit 140 acquires the weight determination formula stored in the storage unit as necessary, applies the image to the weight determination formula to determine the weight, and provides the determined weight to the output combining unit 121. Alternatively, the weight determination unit 140 may store the weight determination formula. Alternatively, when determining the weight, the weight determination unit 140 may acquire the weight determination formula from a device that stores a weight determination formula (not illustrated).

The weight determination unit 140 may use a weight determination formula learned in advance using a predetermined method such as AI. For example, the weight determination unit 140 may use a weight determination formula that has learned a parameter (a coefficient of $a_i(p)$) using predetermined training data for learning the weights.

Description of Operation

Next, an operation in the determination phase in the state determination device 11 according to the second example embodiment will be described with reference to the drawings.

Figure 8:
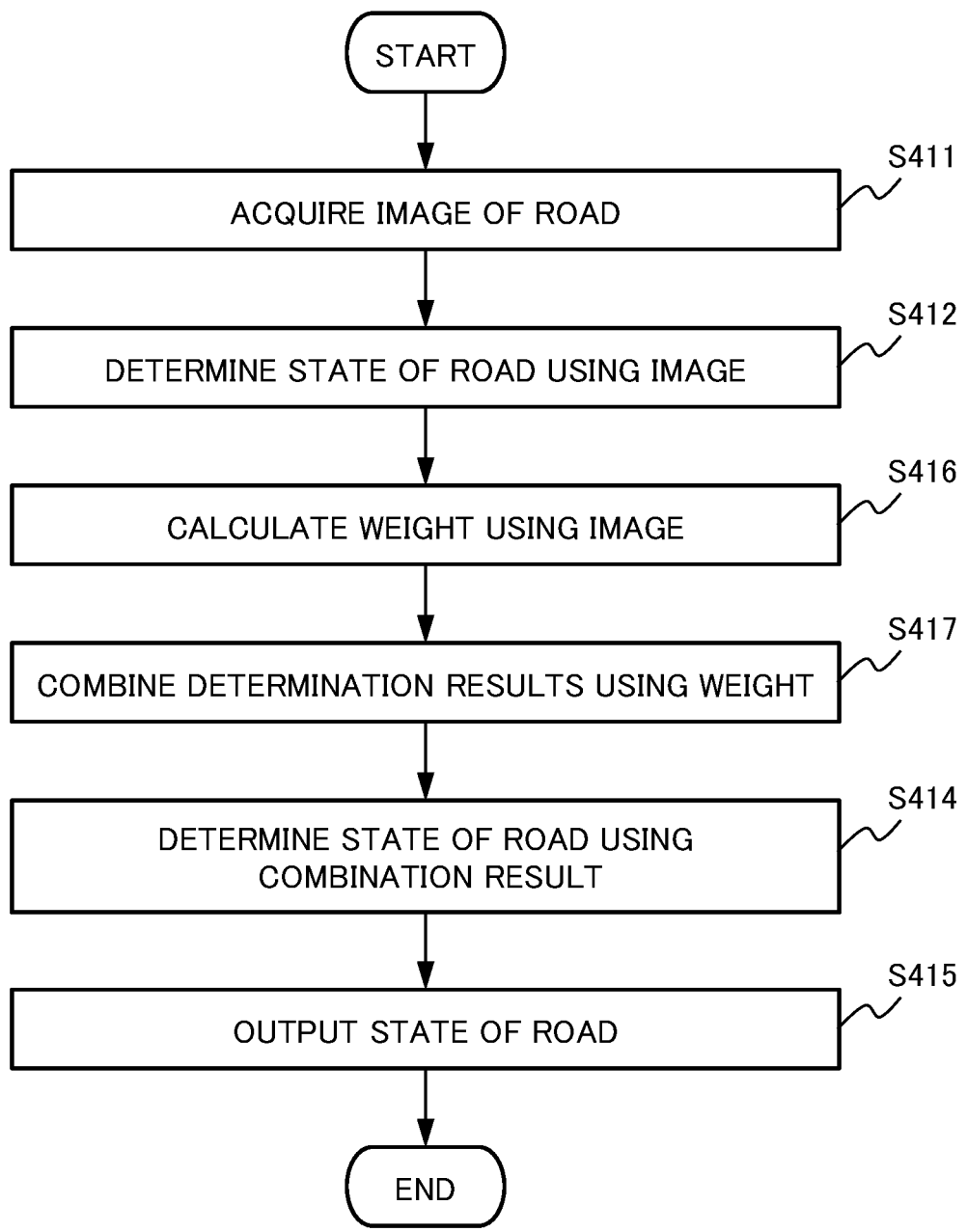
FIG. 8 is a flowchart illustrating an example of an operation in a determination phase of the state determination device according to the second example embodiment.

FIG. 8 is a flowchart illustrating an example of the operation in the determination phase of the state determination device 11 according to the second example embodiment.

The determination model 110 has been learned.

The state determination device 11 acquires an image of a road to be determined from a predetermined device (step S411). For example, the state determination device 11 may acquire an image of a road captured by the imaging device 20. Alternatively, the state determination device 11 may acquire an image of a road stored in the image storage device 25.

Then, each determination model 110 determines the state of the road using the image of the road (step S412). For example, each determination model 110 determines road deterioration (for example, the location and type of degradation). Then, the determination model 110 outputs the determination result to the output combining unit 120.

The weight determination unit 140 determines the weight using the image (step S416).

The output combining unit 121 combines output (determination results) of the determination model 110 using the determined weights (step S417). Then, the output combining unit 121 outputs the combined result to the state determination unit 130.

The state determination unit 130 determines the state of the road using the result of the combination by the output combining unit 121 (step S414).

Then, the state determination unit 130 outputs the state of the road (for example, the deterioration) to a predetermined device (step S415). The state determination unit 130 may include the result of a combination by the output combining unit 121 (for example, the location and type of degradation) in the state of the road.

Description of Effects

Next, effects of the state determination device 11 according to the second example embodiment will be described.

The state determination device 11 according to the second example embodiment can obtain the effects same as those of the state determination device 10 according to the first example embodiment.

The reason is as follows.

This is because the output combining unit 121 operates using the weight determined by the weight determination unit 140 as in the output combining unit 120.

Furthermore, the state determination device 11 according to the second example embodiment can obtain an effect of further improving the accuracy of determination.

The reason is as follows.

The weight determination unit 140 determines the weight to be used by the output combining unit 121 based on the image to be determined. That is, the weight determination unit 140 determines the weight in accordance with the image to be determined.

Then, the output combining unit 121 combines output of the determination models 110 using the weight related to the image to be determined. That is, the output combining unit 121 can execute the more appropriate combination.

As a result, the state determination device 11 can further improve the accuracy of a determination of the state of the road.

Third Example Embodiment

Next, a third example embodiment will be described with reference to the drawings.

Description of Configuration

Figure 9:
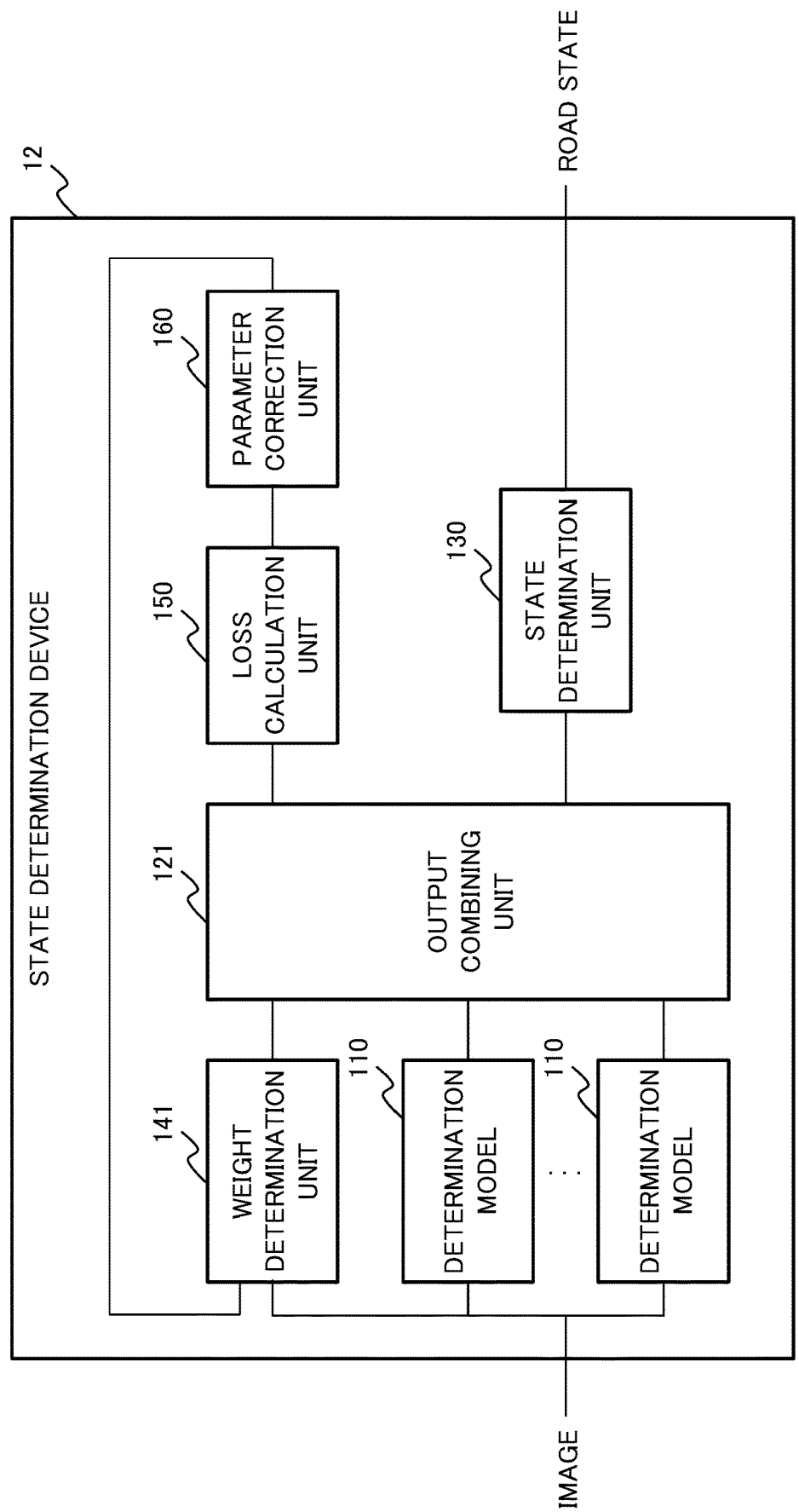
FIG. 9 is a block diagram illustrating an example of a configuration of a state determination device according to a third example embodiment.

FIG. 9 is a block diagram illustrating an example of a configuration of a state determination device 12 according to the third example embodiment.

The state determination device 12 includes a plurality of determination models 110, an output combining unit 121, a state determination unit 130, a weight determination unit 141, a loss calculation unit 150, and a parameter correction unit 160.

The state determination device 12 may be configured using a computer illustrated in FIG. 5. Alternatively, the state determination system 50 may include the state determination device 12 instead of the state determination devices 10 and 11.

The determination model 110 and the state determination unit 130 are similar to the determination model 110 and the state determination unit 130 of the first example embodiment and the second example embodiment. The output combining unit 121 is similar to the output combining unit 121 of the second example embodiment.

Therefore, detailed description of configurations and operations similar to those of the first example embodiment and the second example embodiment will be omitted, and configurations and operations specific to the third example embodiment will be described.

The loss calculation unit 150 and the parameter correction unit 160 operate in the weight learning phase in the weight determination unit 141. The weight determination unit 141 operates as in the weight determination unit 140 except that it learns the weight in cooperation with the loss calculation unit 150 and the parameter correction unit 160.

Therefore, a configuration related to the learning phase in the weight determination unit 141 will be described.

The loss calculation unit 150 calculates a difference (loss) between data (for example, a deterioration position and its score in each image, hereinafter referred to as "correct answer label") indicating a correct answer for the training data for learning the weights and a result of a combination by the output combining unit 121. In the following description, data indicating a correct answer is referred to as a "correct answer label". In the following description, the loss calculated by the loss calculation unit 150 is referred to as a "combination loss" or a "first loss".

A configuration for storing the correct answer label is any configuration. The loss calculation unit 150 may store a correct answer label related to the training data for learning the weights in advance. Alternatively, the state determination device 12 may store the correct answer label in a storage unit (not illustrated). Alternatively, in the calculation of the loss, the loss calculation unit 150 may acquire the correct answer label from a device or a configuration that stores training data for learning the weights.

The parameter correction unit 160 corrects the parameter (for example, the coefficient of the function $a_i(p)$ of Equation (1)) of the weight determination formula used by the weight determination unit 140, based on the loss calculated by the loss calculation unit 150.

Description of Operation

Next, an operation of the state determination device 12 according to the third example embodiment will be described with reference to the drawings.

Figure 10:
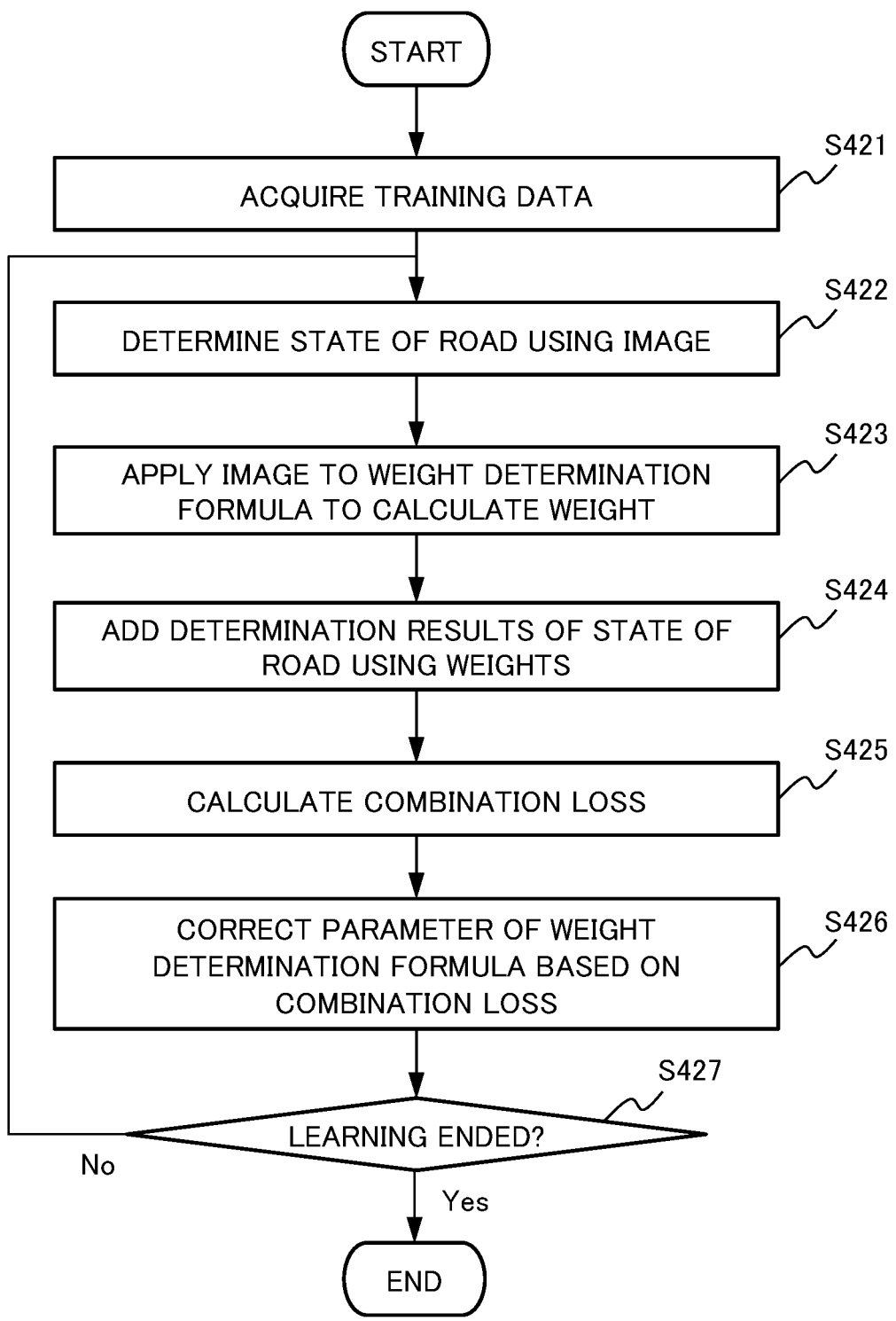
FIG. 10 is a flowchart illustrating an example of operation in a learning phase of a weight determination unit according to the third example embodiment.

FIG. 10 is a flowchart illustrating an example of the operation in the learning phase of the weight determination unit 141 according to the third example embodiment.

The weight determination unit 141 stores a predetermined weight determination formula (for example, the weight determination formula in which the coefficient of the function $a_i(p)$ has a predetermined value) as an initial value of the weight before the operation in the learning phase.

The state determination device 12 acquires an image as training data for learning the weights (step S421).

The state determination device 12 selects one image from the training data for learning the weights. Then, each of the plurality of determination models 110 determines the state of the road using the selected image (step S422). Then, the determination model 110 outputs the determination result to the output combining unit 121.

The weight determination unit 141 applies the selected image to the weight determination formula to determine the weight (step S423).

The output combining unit 121 combines output of the determination models 110 using the weights determined by the weight determination unit 141 (step S424).

The loss calculation unit 150 calculates a loss (combination loss) between the correct answer label and the result of a combination by the output combining unit 121 (step S425).

The parameter correction unit 160 corrects the parameter (for example, the coefficient of the function $a_i(p)$) of the weight determination formula based on the loss (combination loss) calculated by the loss calculation unit 150 (step S426).

The state determination device 12 determines whether learning is finished (step S427). Specifically, the state determination device 12 determines whether a predetermined end condition (for example, the value of loss is smaller than a threshold value, perform execution a prescribed number of times, or termination of training data for learning the weights) is satisfied.

When the end condition is not satisfied (No in step S427), the state determination device 12 returns the process to step S422.

When the end condition is satisfied (Yes in step S427), the state determination device 12 ends the learning phase.

In this manner, the state determination device 12 learns the weight (for example, the parameter of the weight determination formula) determined by the weight determination unit 141 using the training data for learning the weights.

In the determination phase, the state determination device 12 operates as in the state determination device 11 of the second example embodiment. That is, in the determination phase, the state determination device 12 determines the state of the road using the determination model 110, the output combining unit 121, the state determination unit 130, and the weight determination unit 141.

The operation in the determination phase of the state determination device 12 will be described with reference to FIG. 8.

The state determination device 12 acquires an image of a road to be determined from a predetermined device (step S411).

The determination model 110 outputs the state of the road using the image of the road (step S412).

The weight determination unit 141 determines the weight by applying the image of the road to the learned weight determination formula (step S416).

The output combining unit 121 combines output of the determination models 110 using the determined weights (step S417).

The state determination unit 130 determines the state of the road using the result of a combination (step S414).

The state determination unit 130 outputs the determination result (state of the road) to a predetermined device (step S415).

Description of Effects

Next, effects of the state determination device 12 according to the third example embodiment will be described.

The state determination device 12 according to the third example embodiment can obtain an effect of further improving determination accuracy in addition to the effects of the first example embodiment and the second example embodiment.

The reason is as follows.

In the learning phase, the weight determination unit 141 learns the weight using the training data for learning the weights. Then, in the determination phase, the weight determination unit 141 determines the weight using the learned weight determination formula.

The output combining unit 121 combines output of the determination models 110 using the determined weights. That is, the output combining unit 121 combines the output using the weights learned using the training data for learning the weights. Therefore, the output combining unit 121 can execute more appropriate combination.

As a result, the state determination device 12 can further improve the accuracy of a determination of the state of the road.

Fourth Example Embodiment

Next, a fourth example embodiment will be described with reference to the drawings.

Description of Configuration

Figure 11:
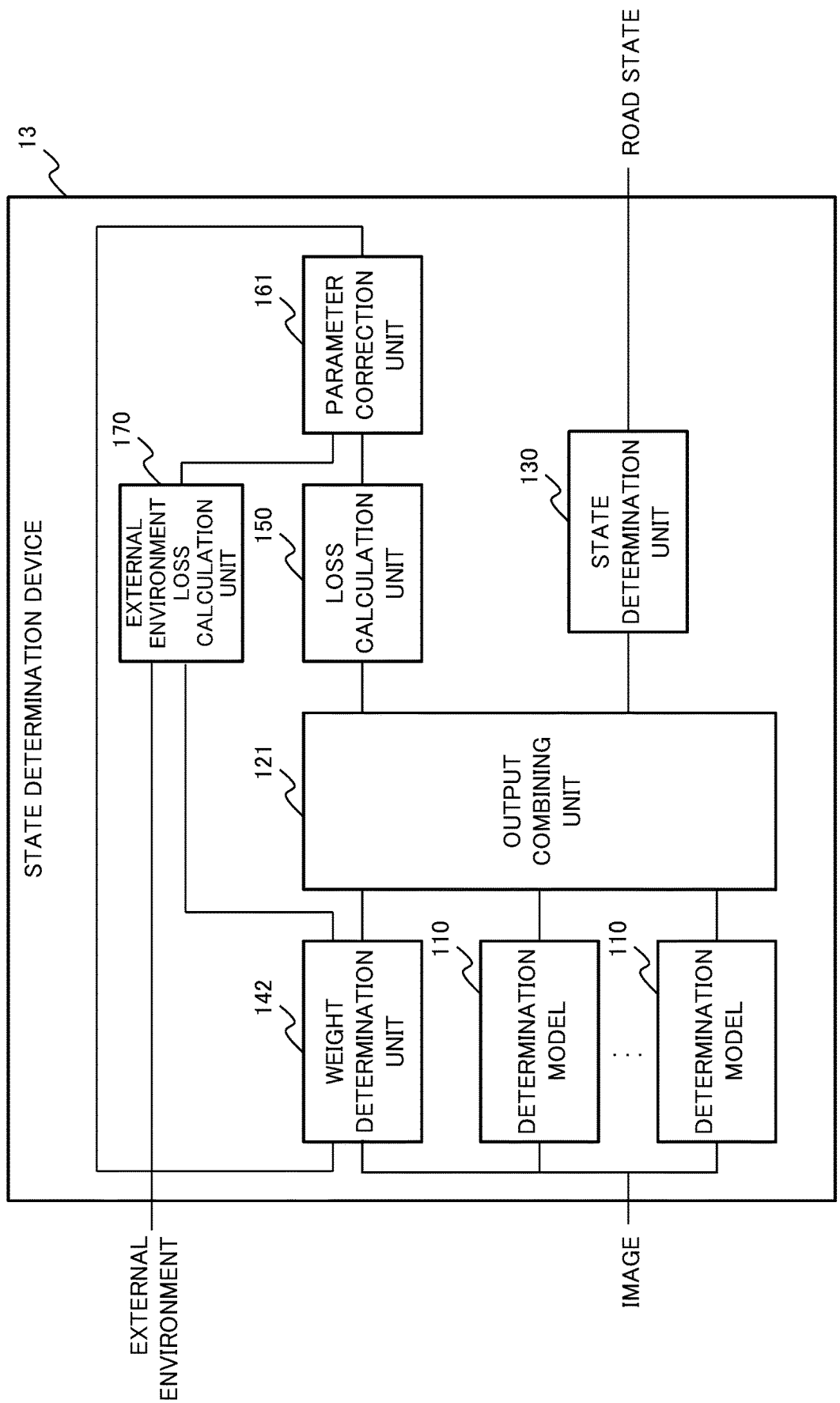
FIG. 11 is a block diagram illustrating an example of a configuration of a state determination device according to a fourth example embodiment.

FIG. 11 is a block diagram illustrating an example of a configuration of a state determination device 13 according to the fourth example embodiment.

The state determination device 13 includes a plurality of determination models 110, an output combining unit 121, a state determination unit 130, a weight determination unit 142, a loss calculation unit 150, a parameter correction unit 161, and an external environment loss calculation unit 170.

The state determination device 13 may be configured using a computer illustrated in FIG. 5.

The determination model 110 and the state determination unit 130 are similar to the determination model 110 and the state determination unit 130 of the first to third example embodiments. The output combining unit 121 is similar to the output combining unit 121 of the second example embodiment and the third example embodiment. The loss calculation unit 150 is similar to the loss calculation unit 150 of the third example embodiment.

Therefore, detailed description of configurations and operations similar to those of the first to third example embodiments will be omitted, and configurations and operations specific to the fourth example embodiment will be described.

The loss calculation unit 150, the parameter correction unit 161, and the external environment loss calculation unit 170 operate in the weight learning phase in the weight determination unit 142. The weight determination unit 142 operates as in the weight determination unit 141 except for the operation of learning the weight in the learning phase.

Therefore, a configuration related to the learning phase in the weight determination unit 142 will be described.

As in the weight determination unit 141, the weight determination unit 142 determines a weight using an image of training data for learning the weights. Furthermore, the weight determination unit 142 estimates the external environment using the image to output the estimated external environment to the external environment loss calculation unit 170.

The weight determination unit 142 desirably shares at least part of the processing in the calculation of the weight and the estimation of the external environment.

For example, in a case where the weight determination unit 142 uses a deep neural network, the weight determination unit 142 may make a lower layer of the deep neural network common and make an upper layer specialized in calculation of a weight and estimation of an external environment. In this case, the weight determination unit 142 shares some of the parameters for determining the weight and some of the parameters for estimating the external environment common. In this case, the learning by the weight determination unit 142 is so-called multi-task learning.

Then, since the weight determination unit 142 uses a deep neural network in which the calculation of the weight and the estimation of the external environment are partially shared, the weight for the determination model 110 learned using a similar external environment tends to be a similar weight. As a result, the state determination device 13 can obtain an effect of stabilizing learning by the weight determination unit 142.

However, the weight determination unit 142 may use different processing in the calculation of the weight and the estimation of the external environment.

The external environment loss calculation unit 170 acquires an external environment related to an image of training data for learning the weights. An acquisition source of the external environment is any acquisition source. The external environment loss calculation unit 170 may acquire an external environment related to an image of training data for learning the weights from a provider of training data for learning the weights.

Alternatively, the external environment loss calculation unit 170 may acquire the external environment from a device (not illustrated) with reference to training data for learning the weights. For example, the external environment loss calculation unit 170 may acquire weather data such as weather from a company or the like that provides the weather data with reference to the imaging date and time and place of the image of the training data for learning the weights.

Then, the external environment loss calculation unit 170 calculates a difference (loss) between the acquired external environment and the external environment estimated by the weight determination unit 142. In the following description, the loss calculated by the external environment loss calculation unit 170 is referred to as an "external environment loss" or a "second loss".

Then, the external environment loss calculation unit 170 outputs the calculated loss (external environmental loss) to the parameter correction unit 161.

The parameter correction unit 161 corrects the parameter of the weight determination formula used by the weight determination unit 142 to calculate the weight, based on a loss (combination loss) calculated by the loss calculation unit 150 and a loss (external environment loss) calculated by the external environment loss calculation unit 170.

Description of Operation

Next, an operation of the state determination device 13 according to the fourth example embodiment will be described with reference to the drawings.

Figure 12:
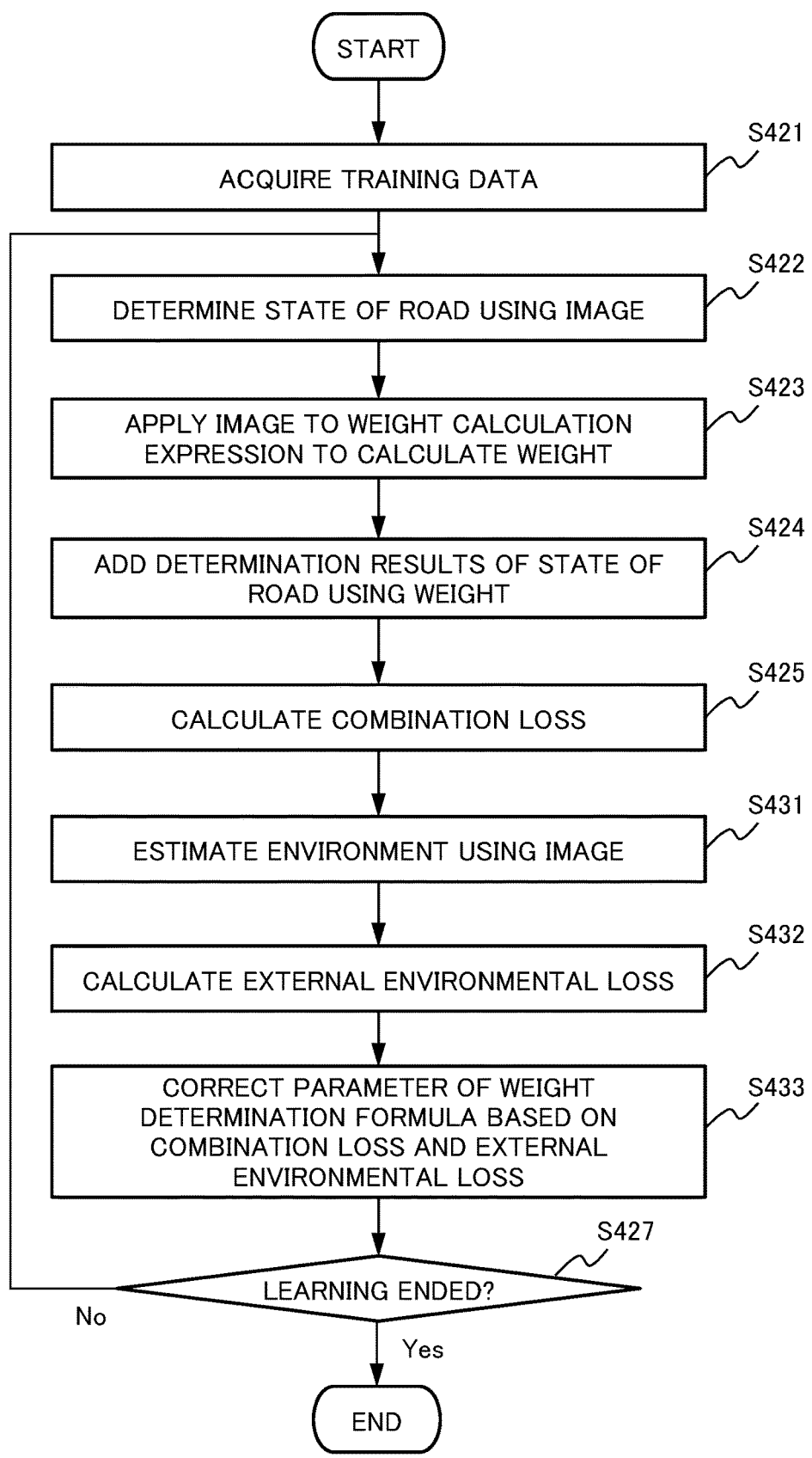
FIG. 12 is a flowchart illustrating an example of operation in a learning phase of a weight determination unit according to the fourth example embodiment.

FIG. 12 is a flowchart illustrating an example of the operation in the learning phase of the weight determination unit 142 according to the fourth example embodiment.

The weight determination unit 142 stores a predetermined weight determination formula as an initial value of the weight before the operation in the learning phase.

Steps S421 to S425 and S427 are operations similar to those in FIG. 10.

The state determination device 13 acquires an image as training data for learning the weights (step S421).

The state determination device 13 selects one image from the training data for learning the weights. Then, each of the plurality of determination models 110 determines the state of the road using the selected image (step S422). Then, the determination model 110 outputs the determination result to the output combining unit 121.

The weight determination unit 142 applies the selected image to the weight determination formula to determine the weight (step S423).

The output combining unit 121 combines output of the determination models 110 using the weights determined by the weight determination unit 141 (step S424).

The loss calculation unit 150 calculates a loss (combination loss) between the correct answer label and the result of a combination by the output combining unit 121 (step S425).

Furthermore, the weight determination unit 142 estimates the environment using the image (step S431).

The external environment loss calculation unit 170 calculates the external environment loss (step S432).

The parameter correction unit 161 corrects the parameter of the weight determination formula used by the weight determination unit 142 to calculate the weight, based on the loss (combination loss) calculated by the loss calculation unit 150 and the loss (external environment loss) calculated by the external environment loss calculation unit 170 (step S433).

The state determination device 13 determines whether learning is finished (step S427). Specifically, the state determination device 13 determines whether a predetermined end condition (for example, the value of any loss or both losses is smaller than a threshold value, perform execution a prescribed number of times, or termination of training data for learning the weights) is satisfied.

When the end condition is not satisfied (No in step S427), the state determination device 13 returns the process to step S422.

When the end condition is satisfied (Yes in step S427), the state determination device 13 ends the learning phase.

The state determination device 13 may replace the execution order of the operations from steps S422 to S425 and the operations from S431 to S432. Alternatively, the state determination device 13 may execute at least some of the operations from steps S422 to S425 and the operations from S431 to S432 in parallel.

In this manner, the state determination device 13 learns the weight determined by the weight determination unit 142 using the training data for learning the weights and the external environment.

In the determination phase, the state determination device 13 operates as in the state determination device 11 of the second example embodiment and the state determination device 12 of the third example embodiment. That is, in the determination phase, the state determination device 13 determines the state of the road using the determination model 110, the output combining unit 121, the state determination unit 130, and the weight determination unit 142.

The operation in the determination phase of the state determination device 13 will be described with reference to FIG. 8.

The state determination device 13 acquires an image of a road to be determined from a predetermined device (step S411).

The determination model 110 outputs the state of the road using the image of the road (step S412).

The weight determination unit 142 determines the weight by applying the image of the road to the learned weight determination formula (step S412).

The output combining unit 121 combines output of the determination models 110 using the determined weights (step S417).

The state determination unit 130 determines the state of the road using the result of a combination (discarding step S414).

The state determination unit 130 outputs the determination result (state of the road) to a predetermined device (step S415).

Description of Effects

Next, effects of the state determination device 13 according to the fourth example embodiment will be described.

The state determination device 13 according to the fourth example embodiment can obtain an effect of further improving the accuracy of determination in addition to the effects of the first to third example embodiments.

The reason is as follows.

In the learning phase, the weight determination unit 142 learns the parameter of the weight determination formula using the external environment in addition to the training data for learning the weights. Then, in the determination phase, the weight determination unit 142 determines the weight using the learned weight determination formula.

The output combining unit 121 combines output of the determination models 110 using the determined weights. That is, the output combining unit 121 combines the outputs using the weights learned using the external environment in addition to the training data for learning the weights. Therefore, the output combining unit 121 can execute more appropriate combination.

As a result, the state determination device 13 can further improve the accuracy of a determination of the state of the road.

System

Figure 13:
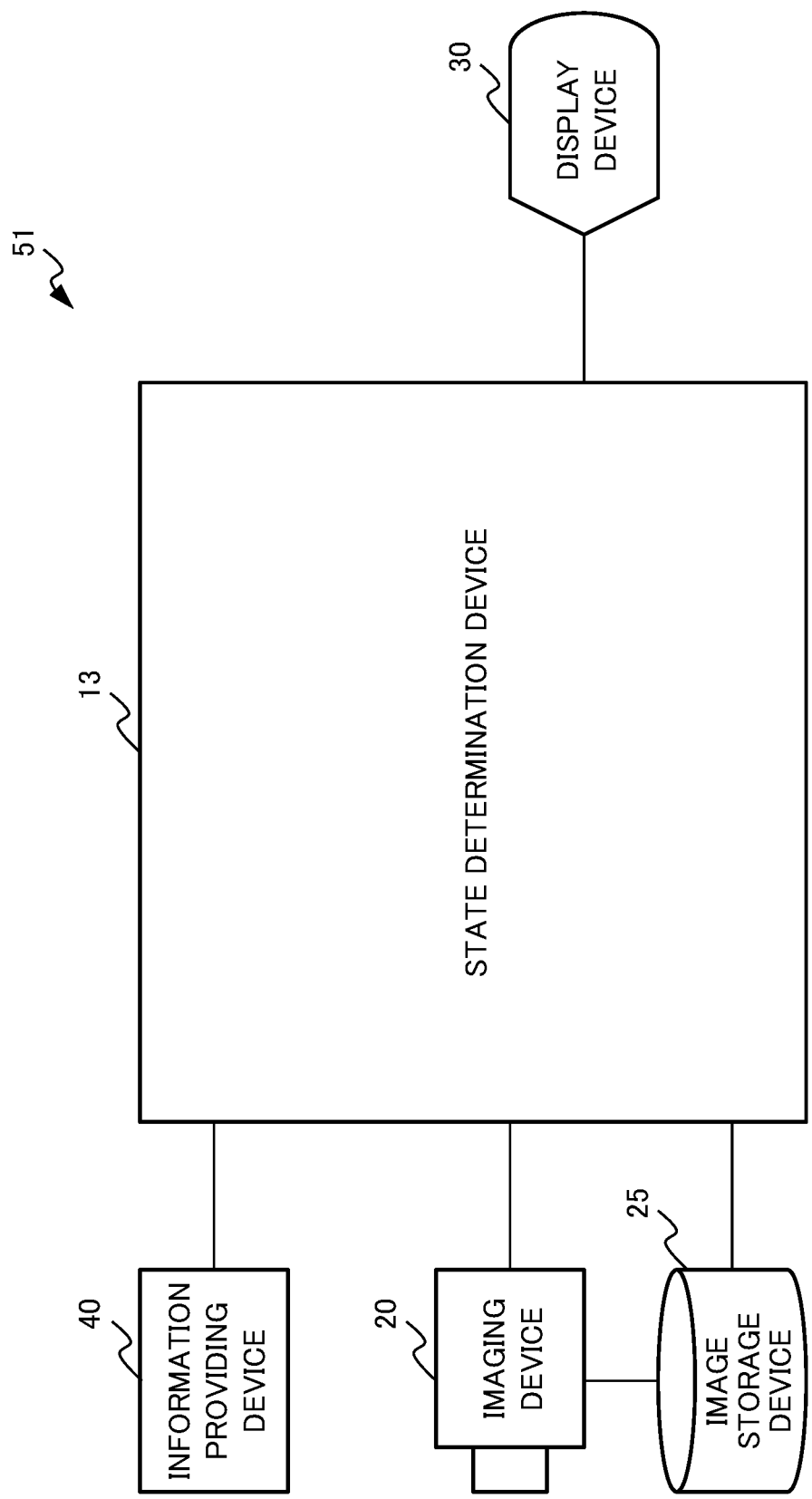
FIG. 13 is a block diagram illustrating an example of a configuration of a state determination system including the state determination device according to the fourth example embodiment.

FIG. 13 is a block diagram illustrating an example of a configuration of a state determination system 51 including the state determination device 13 according to the fourth example embodiment.

The state determination system 51 includes the state determination device 13, an imaging device 20 and/or an image storage device 25, a display device 30, and an information providing device 40.

The imaging device 20, the image storage device 25, and the display device 30 are similar to those of the first example embodiment. Therefore, a detailed description thereof will be omitted.

The information providing device 40 outputs the external environment to the state determination device 13. The imaging device may output at least part of the external environment to the state determination device 13.

Whether the state determination device 13 acquires the external environment from the information providing device 40 or the imaging device 20 may be appropriately determined by a user or the like.

Then, the state determination device 13 operates as described above to output the state of the road to the display device 30 as a result of the determination.

Fifth Example Embodiment

A fifth example embodiment will be described with reference to the drawings.

Description of Configuration

Figure 14:
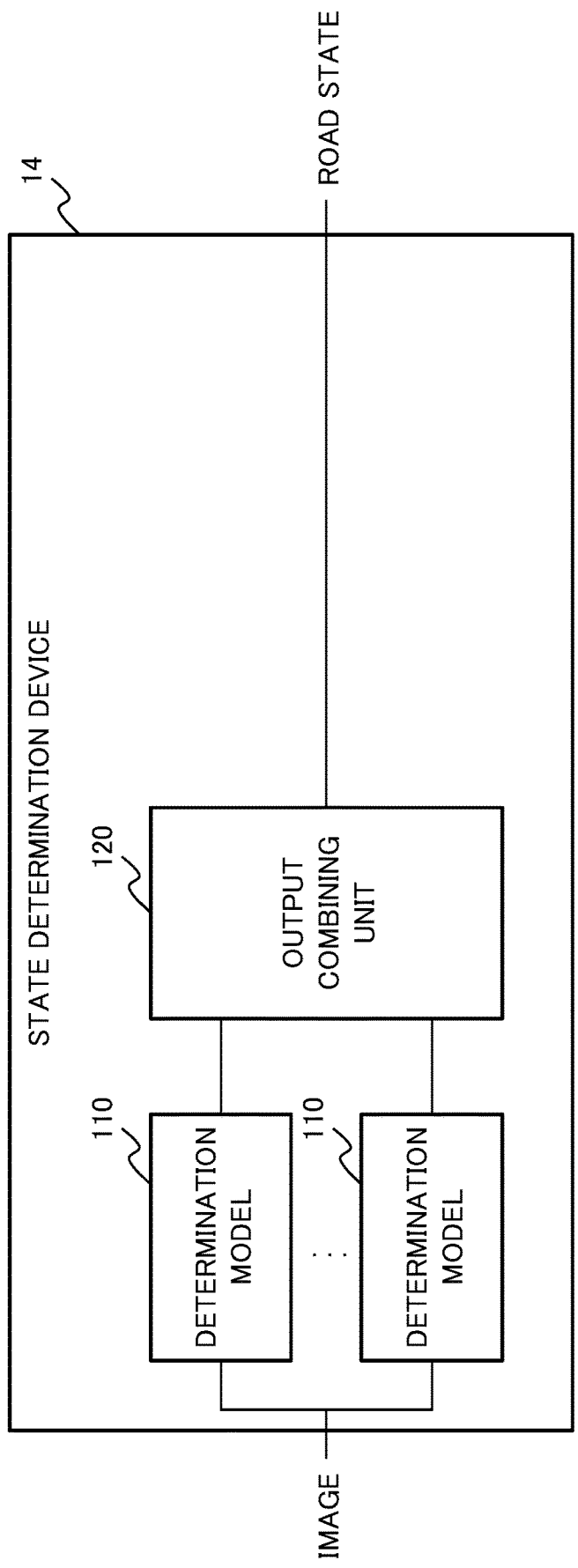
FIG. 14 is a block diagram illustrating an example of a configuration of a state determination device according to a fifth example embodiment.

FIG. 14 is a diagram illustrating an example of a configuration of a state determination device 14 according to the fifth example embodiment.

The state determination device 14 includes a plurality of determination models 110 and an output combining unit 120. The determination model 110 is similar to the determination model 110 of the first to fourth example embodiments. The output combining unit 120 is similar to the output combining unit 120 of the first example embodiment.

Each configuration of the state determination device 14 operates as in the related configuration in the state determination device 10 of the first example embodiment or the like.

The state determination device 14 may be configured using a computer illustrated in FIG. 5. Alternatively, the state determination system 50 may include the state determination device 14 instead of the state determination devices 10 to 12.

Description of Effects

The state determination device 14 has an effect of improving the accuracy of a determination of a state related to a road.

The reason is as follows.

The state determination device 14 includes the plurality of determination models 110 and the output combining unit 120. The determination models 110 are determination models each learned using training data in which at least one of the state of the moving object mounting the imaging device that acquires the image of the road, the state of the road, and the external environment is different. The output combining unit 120 combines output from the plurality of determination models for the input image of the road.

In this manner, each configuration of the state determination device 14 operates as in the related configuration in the state determination device 10 of the first example embodiment and the like. That is, the output combining unit 120 of the state determination device 14 combines the results of a determination by the plurality of determination models 110 using a predetermined method. Therefore, the state determination device 14 can output the state of the road with higher accuracy as compared with the case of using one model.

The user may use a result of a combination by the output combining unit 120 in the state determination device 14 as the state of the road. Alternatively, the user may determine the state of the road by providing output of the state determination device 14 to a device (not illustrated) that determines the state of the road in detail.

The state determination device 14 according to the fifth example embodiment has the minimum configuration in each example embodiment.

Some or all of the above example embodiments may be described as the following Supplementary Notes, but are not limited to the following.

(Supplementary Note 1)

A state determination device includes:

a memory; and at least one processor coupled to the memory, the processor performing operations, the operations including:

combining output from a plurality of determination models for an input image of a road, the plurality of determination models each learned using training data in which at least one of a state of a moving object mounting an imaging device that acquires an image of the road, a state of the road, and an external environment is different.

(Supplementary Note 2)

The state determination device according to Supplementary Note 1, wherein the operations further include:

determining and outputting a state of the road based on a result of the combination by the output combining means.

(Supplementary Note 3)

The state determination device according to Supplementary Note 1 or 2, wherein the operations further include:

training the plurality of determination models using a plurality of pieces of training data including images of the road in which at least one of a state of the moving object, a state of the road, and the external environment is mutually different.

(Supplementary Note 4) The state determination device according to any one of Supplementary Notes 1 to 3, wherein the operations further include:

determining weights to be used for combining output of the plurality of determination models in accordance with an input image of the road; and combining output of the plurality of determination models using the determined weights.

(Supplementary Note 5)

The state determination device according to Supplementary Note 4, wherein the operations further include:

learning a parameter for determining the weights using training data for learning the weights.

(Supplementary Note 6)

The state determination device according to Supplementary Note 5, wherein the operations further include:

learning the parameter for determining the weights in accordance with the external environment.

(Supplementary Note 7)

A state determination system including:

the state determination device according to any one of Supplementary Notes 1 to 5;

an imaging device that acquires an image of a road to be determined to output the image to the state determination device, and/or a storage device that stores the image of the road to be determined; and a display device that displays a state of a road output by the state determination device.

(Supplementary Note 8)

A state determination system includes:

the state determination device according to Supplementary Note 6;

an imaging device that captures an image of a road to be determined to output the image to the state determination device, and/or a storage device that stores the image of the road to be determined;

an information providing device that outputs an external environment to the state determination device; and a display device that displays a state of a road output by the state determination device.

(Supplementary Note 9)

A state determination method includes:

by a state determination device, combining output from a plurality of determination models for an input image of a road, the plurality of determination models each learned using training data in which at least one of a state of a moving object mounting an imaging device that acquires an image of the road, a state of the road, and an external environment is different.

(Supplementary Note 10)

The state determination method according to Supplementary Note 9, further includes:

determining a state of the road based on a result of the combination.

(Supplementary Note 11)

The state determination method according to Supplementary Note 9 or 10, further includes:

training the plurality of determination models using a plurality of pieces of training data including images of the road in which at least one of a state of the moving object, a state of the road, and the external environment is mutually different.

(Supplementary Note 12)

The state determination method according to any one of Supplementary Notes 9 to 11, further includes:

determining weights to be used for combining output of the plurality of determination models in accordance with an input image of the road; and combining output of the plurality of determination models using the determined weights.

(Supplementary Note 13)

The state determination method according to Supplementary Note 12, further includes:

learning a parameter for determining the weights using training data for learning the weights.

(Supplementary Note 14)

The state determination method according to Supplementary Note 13, further includes:

learning the parameter for determining the weights in accordance with an external environment.

Supplementary Note 15

A state determination method includes:
by a state determination device, executing the state determination method according to any one of Supplementary Notes 9 to 13;
by an imaging device, acquiring an image to be determined to output the image to the state determination device, and/or, by the storage device, storing the image to be determined; and
by a display device, displaying a state of a road output by the state determination device.

Supplementary Note 16

A state determination method includes:
by a state determination device, executing the state determination method according to Supplementary Note 14;
by an imaging device, acquiring an image of a road to be determined to output the image to the state determination device, and/or a storage device storing the image to be determined;
by an information providing device, outputting an external environment to the state determination device; and
by a display device, displaying a state of a road output by the state determination device.

(Supplementary Note 17)

A non-transitory computer-readable recording medium embodying a program for causing a computer to perform a method, the method including: combining output from a plurality of determination models for an input image of a road, the plurality of determination models each learned using training data in which at least one of a state of a moving object mounting an imaging device that acquires an image of the road, a state of the road, and an external environment is different.

(Supplementary Note 18)

The recording medium according to Supplementary Note 17, wherein the medium embodies the program for causing the computer to perform the method, the method further including:
determining a state of the road based on a result of the combination.

(Supplementary Note 19)

The recording medium according to Supplementary Note 17 or 18, wherein the medium embodies the program for causing the computer to perform the method, the method further including:
training the plurality of determination models using a plurality of pieces of training data including images of the road in which at least one of a state of the moving object, a state of the road, and the external environment is mutually different.

(Supplementary Note 20)

The recording medium according to any one of Supplementary Notes 17 to 19, wherein the medium embodies the program for causing the computer to perform the method, the method further including:
determining weights to be used for combining output of the plurality of determination models in accordance with an input image of the road; and
combining output of the plurality of determination models using the determined weights.

(Supplementary Note 21)

The recording medium according to Supplementary Note 20, wherein the medium embodies the program for causing the computer to perform the method, the method further including:
learning a parameter for determining the weights using training data for learning the weights.

(Supplementary Note 22)

The recording medium according to Supplementary Note 21, wherein the medium embodies the program for causing the computer to perform the method, the method further including:
learning the parameter for determining the weights in accordance with the external environment.

Although the present invention is described above with reference to the example embodiments, the present invention is not limited to the above example embodiments. It will be understood by those of ordinary skill in the art that various changes in form and details may be made therein without departing from the spirit and scope of the present invention as defined by the claims.

REFERENCE SIGNS LIST 10 state determination device
11 state determination device
12 state determination device
13 state determination device
20 imaging device
25 image storage device
30 display device
40 information providing device
50 state determination system
51 state determination system
110 determination model
120 output combining unit
121 output combining unit
130 state determination unit
140 weight determination unit
141 weight determination unit
142 weight determination unit
150 loss calculation unit
160 parameter correction unit
161 parameter correction unit
170 external environment loss calculation unit
610 CPU
620 ROM
630 RAM
640 storage device
650 NIC
690 recording medium
810 vehicle
820 drive recorder
830 wireless communication path
840 radio base station
850 network

What is claimed is:

1. A state determination device comprising:
a memory storing instructions; and
at least one processor configured to execute the instructions to perform operations comprising:
determining weights for combining outputs of a plurality of determination models respectively determined by the plurality of determination models using a same input image of a target road, each of the plurality of determination models having been trained using training data in which at least one of a state of a moving object on which an imaging device that is to acquire an image of the road is mounted, a state of the road in the acquired image, and an external environment in which the image of the road has been acquired by the imaging device is different than that in the training data used to train one or more other of the plurality of determination models; and combining the outputs of the plurality of determination models for the same input image of the target road using the determined weights.

2. The state determination device according to claim 1, wherein the operations further comprise:

determining and outputting a state of the target road based on a result of combining the outputs of the plurality of determination models for the same input image.

3. The state determination device according to claim 1, wherein combining the outputs of the plurality of determination models for the image of the target road using the determined weights comprises respectively multiplying outputs of the plurality of determination models by the determined weights.

4. The state determination device according to claim 3, wherein the operations further comprise:

learning a parameter for determining the weights using training data for learning the weights.

5. The state determination device according to claim 4, wherein learning the parameter for determining the eights using the training data for learning the weights comprises:

learning the parameter for determining the weights in accordance with the external environment.

6. The state determination device according to claim 1, wherein the plurality of determination models respectively determine the outputs as a state of deterioration of the road and structures related to the road.

7. A state determination method performed by a computer and comprising:

determining weights for combining outputs of a plurality of determination models respectively determined by the plurality of determination models using a same input image of a target road, each of the plurality of determination models having been trained using training data in which at least one of a state of a moving object on which an imaging device that is to acquire an image of the road is mounted, a state of the road in the acquired image, and an external environment in which the image of the road has been acquired by the imaging device is different than that in the training data used to train one or more other of the plurality of determination models; and combining the outputs of the plurality of determination models for the same input image of the target road using the determined weights.

8. The state determination method according to claim 7, further comprising:

determining and outputting a state of the target road based on a result of combining the outputs of the plurality of determination models for the same input image.

9. The state determination method according to claim 7, wherein combining the outputs of the plurality of determination models for the image of the target road using the determined weights comprises respectively multiplying outputs of the plurality of determination models by the determined weights.

10. The state determination method according to claim 9, further comprising:

learning a parameter for determining the weights using training data for learning the weights.

11. The state determination method according to claim 10, wherein learning the parameter for determining the eights using the training data for learning the weights comprises:

learning the parameter for determining the weights in accordance with the external environment.

12. The state determination method according to claim 7, wherein the plurality of determination models respectively determine the outputs as a state of deterioration of the road and structures related to the road.

13. A non-transitory computer-readable recording medium storing a program executable by a computer to perform a method comprising:

determining weights for combining outputs of a plurality of determination models respectively determined by the plurality of determination models using a same input image of a target road, each of the plurality of determination models having been trained using training data in which at least one of a state of a moving object on which an imaging device that is to acquire an image of the road is mounted, a state of the road in the acquired image, and an external environment in which the image of the road has been acquired by the imaging device is different than that in the training data used to train one or more other of the plurality of determination models; and combining the outputs of the plurality of determination models for the same input image of the target road using the determined weights.

14. The non-transitory computer-readable recording medium according to claim 13, wherein the method further comprises:

determining and outputting a state of the target road based on a result of combining the outputs of the plurality of determination models for the same input image.

15. The non-transitory computer-readable recording medium according to claim 13, wherein combining the outputs of the plurality of determination models for the image of the target road using the determined weights comprises respectively multiplying outputs of the plurality of determination models by the determined weights.

16. The non-transitory computer-readable recording medium according to claim 15, wherein the method further comprises:

learning a parameter for determining the weights using training data for learning the weights.

17. The non-transitory computer-readable recording medium according to claim 16, wherein learning the parameter for determining the eights using the training data for learning the weights comprises:

learning the parameter for determining the weights in accordance with the external environment.

18. The non-transitory computer-readable recording medium according to claim 13, wherein the plurality of determination models respectively determine the outputs as a state of deterioration of the road and structures related to the road.

* * * * *